United States Patent
Fazzone et al.

(10) Patent No.: US 11,968,291 B2
(45) Date of Patent: *Apr. 23, 2024

(54) ACCESS TO DATA BROADCAST IN ENCRYPTED FORM BASED ON BLOCKCHAIN

(71) Applicant: INTERNATIONAL BUSINESS MACHINES CORPORATION, Armonk, NY (US)

(72) Inventors: Davide Fazzone, Baiano (IT); Luigi Lombardi, Naples (IT); Vinicio Bombacino, Rome (IT); Andrea Tortosa, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/303,901

(22) Filed: Apr. 20, 2023

(65) Prior Publication Data
US 2023/0254117 A1  Aug. 10, 2023

Related U.S. Application Data

(63) Continuation of application No. 17/500,414, filed on Oct. 13, 2021, now Pat. No. 11,683,154, which is a
(Continued)

(51) Int. Cl.
*H04L 9/40* (2022.01)
*H04L 9/06* (2006.01)
*H04W 12/06* (2021.01)

(52) U.S. Cl.
CPC .......... *H04L 9/0637* (2013.01); *H04L 9/0643* (2013.01); *H04L 63/0428* (2013.01); *H04L 63/0876* (2013.01); *H04W 12/06* (2013.01)

(58) Field of Classification Search
CPC . H04L 63/0428; H04L 63/0876; H04W 12/06
See application file for complete search history.

(56) References Cited

U.S. PATENT DOCUMENTS 5,852,290 A    12/1998  Chaney
6,286,103 B1    9/2001  Maillard
(Continued)

OTHER PUBLICATIONS

Kirkpatrick, David, "Comcast unveils blockchain-based TV ad tech", Marketing Dive, Jun. 21, 2017, 2 pages, <https://www.marketingdive.com/news/comcast-unveils-blockchain-based-tv-ad-tech/445471/>.
(Continued)

*Primary Examiner* — William S Powers
(74) *Attorney, Agent, or Firm* — Grant M. McNeilly

(57) ABSTRACT

A solution is proposed for controlling access to data that are broadcast over a telecommunication medium. A corresponding method comprises validating by a plurality of validator devices an access request that is submitted by an access device for accessing the data. The validator devices update a blockchain by adding a new block comprising an indication of the access request in response to a positive result of its validation. A provider system transmits cryptographic information for decrypting the data to the access device in response to the new block. A corresponding method for broadcasting data by a provider system and a corresponding method for accessing broadcast data by an access device are proposed. Corresponding computer programs and computer program products for performing the methods are also proposed. Moreover, corresponding structure, provider system and access device are proposed.

25 Claims, 10 Drawing Sheets

Related U.S. Application Data continuation of application No. 16/127,364, filed on Sep. 11, 2018, now Pat. No. 11,153,070.

(56) References Cited

U.S. PATENT DOCUMENTS

| | | | |
|---|---|---|---|
| 7,730,300 B2 | 6/2010 | Candelore | |
| 8,761,394 B2* | 6/2014 | Beals | |
| 9,699,188 B2* | 7/2017 | Hwang | H04L 63/10 |
| 9,858,569 B2 | 1/2018 | Phan | |
| 10,504,179 B1* | 12/2019 | McGuire | G06Q 40/04 |
| 11,153,070 B2 | 10/2021 | Fazzone | |
| 2004/0146015 A1* | 7/2004 | Cross | H04L 9/0894 |
| | | | 370/328 |
| 2011/0317833 A1 | 12/2011 | Westerveld | |
| 2012/0317622 A1* | 12/2012 | Harjanto | G06F 21/44 |
| | | | 726/4 |
| 2013/0247089 A1 | 9/2013 | Kummer | |
| 2014/0351848 A1 | 11/2014 | Wendling | |
| 2015/0127940 A1* | 5/2015 | Polehn | H04N 21/26613 |
| | | | 713/168 |
| 2016/0316247 A1* | 10/2016 | Biagini | H04N 21/25816 |
| 2017/0134161 A1* | 5/2017 | Goeringer | G06Q 20/065 |
| 2018/0101560 A1* | 4/2018 | Christidis | H04L 9/3236 |
| 2018/0189449 A1* | 7/2018 | Karumba | G16H 40/20 |
| 2020/0084020 A1 | 3/2020 | Fazzone | |
| 2022/0038259 A1 | 2/2022 | Fazzone | |

OTHER PUBLICATIONS

List of IBM Patents or Patent Applications Treated as Related, [date signed], 2 pgs.

Stephens, Graham, "How can DVB-T2 broadcast signal be encrypted for paid TV channel usage?" Quora, Sep. 30, 2017, 3 pages, <https://www.quora.com/How-can-DVB-T2-broadcast-signal-be-encrypted-for-paid-TV-channel-usage>.

* cited by examiner

ACCESS TO DATA BROADCAST IN ENCRYPTED FORM BASED ON BLOCKCHAIN

BACKGROUND

The background of the present disclosure is hereinafter introduced with the discussion of techniques relating to its context. However, even when this discussion refers to documents, acts, artifacts and the like, it does not suggest or represent that the discussed techniques are part of the prior art or are common general knowledge in the field relevant to the present disclosure.

Broadcasting is commonly used to distribute data over physical telecommunication media (for example, electromagnetic waves or cables) from a transmitter to dispersed receivers (within a corresponding broadcasting range). The broadcasting is based on a one-to-many model, wherein everyone in the broadcasting range may receive the data (with an appropriate equipment). A typical example is television (TV). In this case, the data are TV transmissions that are broadcast by TV stations to TV sets for their viewing.

Sometimes, access to the data being broadcast has to be limited to authorized receivers. With reference again to the example of the television, in pay TV services, the viewing of the TV transmissions is permitted only to subscribers of a provider of corresponding TV stations, which have subscribed suitable contracts with the provider (involving the payment of corresponding subscription fees). In this case, an access control technique is implemented wherein the data are generally protected by broadcasting them in a masked form that does not allow their direct exploitation (for example, by encrypting them with a secret key commonly referred to as control word). The authorized receivers may easily restore the data in their original form (by decrypting the encrypted data with the control word in this case), whereas any other (unauthorized) receivers may not do it (at least without considerable effort).

For example, in the pay TV services, each subscriber has a decoder for decrypting the TV transmissions and a smart card to be inserted into the decoder for providing the corresponding control words. The smartcard ensures a relatively high level of security of the information stored therein. Moreover, security measures for preventing piracy acts (wherein unauthorized users illicitly manage to view the TV transmissions without subscribing to the provider or in breach of their contracts) may be changed in a relatively inexpensive way by issuing a new smartcard without the need of changing the whole decoder. Particularly, the smartcard stores an entitlement of the subscriber to view specific TV transmissions according to its contract. The entitlement is updated by Management Entitlement Messages (MEMs) addressed to the smartcard that are broadcast by the provider together with the TV transmissions. Moreover, the smartcard stores an exploitation key for recovering the control word. The exploitation key is updated periodically (for example, every month) by Entitlement Control Messages (ECMs) that are broadcast by the provider together with the TV transmissions as well. The control word of any TV transmission is changed very frequently (for example, every few seconds), in order to hinder the piracy acts. Whenever the control word is changed, the provider broadcasts an ECM that contains the control word encrypted with the exploitation key. The smartcard determines whether the subscriber is authorized to view a TV transmission according to its entitlement; if so, the smartcard decrypts the control word (with the exploitation key stored therein) and passes it to the decoder that in turn decrypts the TV transmission.

However, an (authentic) smartcard may be used in a fraudulent decoder to intercept the control words and then distribute them (for example, in Internet) to fraudulent decoders of unauthorized users to allow them viewing the TV transmissions illicitly. The (authentic) smartcard may also be cloned into fraudulent smartcards that may then be used by corresponding unauthorized users to view the TV transmissions illicitly. More simply, illicit sharing of the (authentic) smartcards is possible. For example, a (cheating) subscriber may bring his/her smartcard to the decoder of another subscriber and use it to decrypt the TV transmissions s/he is authorized to view. In this way, the other subscriber may illicitly view TV transmissions that it is not authorized to view; moreover, the TV transmissions may be illicitly viewed in an (unauthorized) condition (for example, in a public environment whereas the subscriber is authorized to view them only in a domestic environment).

SUMMARY

A simplified summary of the present disclosure is herein presented in order to provide a basic understanding thereof. However, the sole purpose of this summary is to introduce some concepts of the disclosure in a simplified form as a prelude to its following more detailed description, and it is not to be interpreted as an identification of its key elements nor as a delineation of its scope.

In some embodiments, an aspect provides a method for controlling access to data that are broadcast over a telecommunication medium. The method comprises validating by a plurality of validator devices an access request that is submitted by an access device for accessing the data. The validator devices update a blockchain by adding a new block comprising an indication of the access request in response to a positive result of its validation. A provider system transmits cryptographic information for decrypting the data to the access device in response to the new block.

A further aspect provides a corresponding method for broadcasting data by a provider system.

A further aspect provides a corresponding method for accessing broadcast data by an access device.

A further aspect provides corresponding computer programs for implementing the methods.

A further aspect provides corresponding computer program products for implementing the methods.

A further aspect provides a corresponding structure.

A further aspect provides a corresponding provider system.

A further aspect provides a corresponding access device.

More specifically, one or more features of the present disclosure are set out in the independent claims and features thereof are set out in the dependent claims, with the wording of all the claims that is herein incorporated verbatim by reference (with any feature provided in a dependent claim applying mutatis mutandis to some or all of the other independent claim).

BRIEF DESCRIPTION OF THE DRAWINGS

The solution of the present disclosure, as well as further features and the advantages thereof, will be best understood with reference to the following detailed description thereof, given purely by way of a non-restrictive indication, to be read in conjunction with the accompanying drawings.

DETAILED DESCRIPTION

With reference in particular to FIG. 1A-FIG. 1D, an example is shown of application of the solution according to an embodiment of the present disclosure.

Figure 1A:
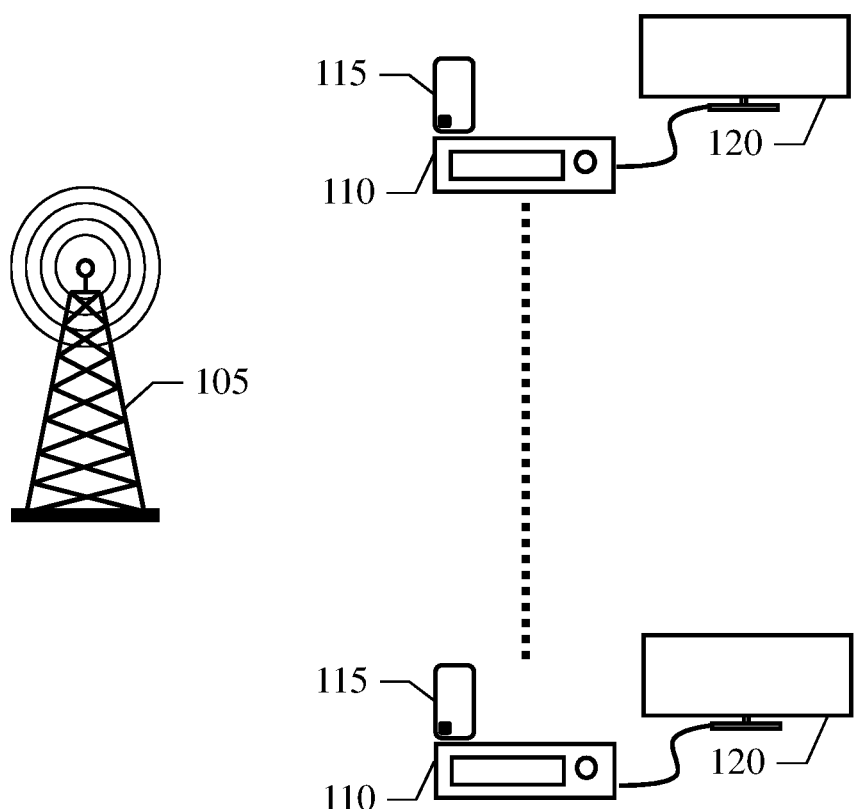
FIG. 1A-FIG. 1D show an example of application of the solution according to an embodiment of the present disclosure.

Starting from FIG. 1A, a provider of TV services has one or more TV stations 105 (only one show in the figure). The TV station 105 broadcasts TV transmissions (i.e., moving images and sound represented by a data stream in digital television) over corresponding TV channels; for example, the TV transmissions are movies, shows, sport events, newscasts, documentaries. The TV transmissions are received by everyone within a broadcast range of the TV station 105 (for example, in a corresponding country). However, the provider implements an access control technique to limit access to the TV transmissions for their viewing only by (authentic) access devices; for example, each access device is formed by a decoder 110 wherein a smartcard 115 is inserted. The access devices 110,115 are assigned by the provider to subscribers thereof, which have subscribed corresponding contracts with the provider (authorizing them to view one or more TV transmissions). For this purpose, the TV transmissions are encrypted with corresponding transmission keys (making the TV transmissions unintelligible); the transmission keys are provided to the access devices 110,115, which decrypt the TV transmissions (restoring their original form) for viewing onto corresponding TV sets 120.

Figure 1B:
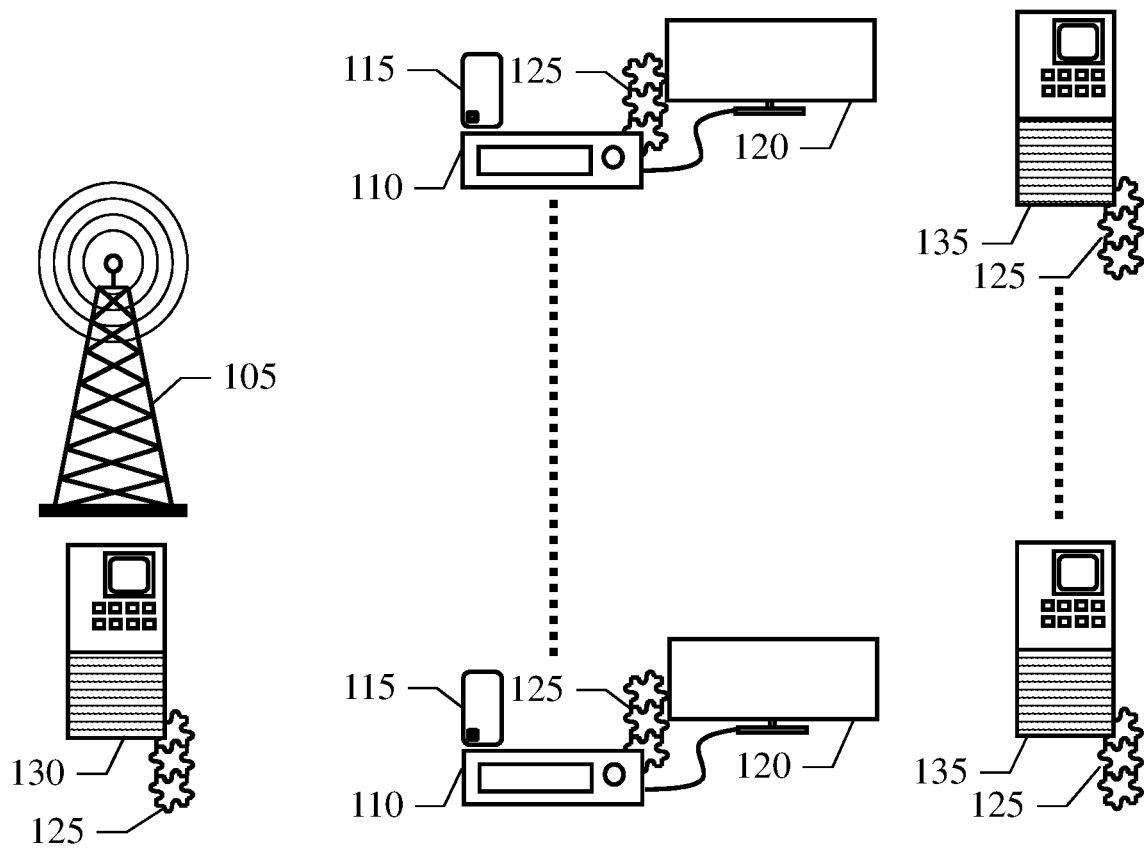

Moving to FIG. 1B, in the solution according to an embodiment of the present disclosure the access control technique is based on a blockchain 125.

In general, a blockchain is a distributed ledger that stores information (in the form of transactions). The transactions are stored into a sequence of blocks in chronological order; the blocks are linked to each other so as to make it more and more computationally difficult to alter a block as the number of further blocks following it in the blockchain increases. The blockchain is distributed in a peer-to-peer network of nodes, which nodes validate its content according to a consensus schema that determines the actual valid version of the blockchain (with no centralized version of the blockchain that exists and no node that is more trusted than any other node is).

More specifically, each block is formed by a body and a header. The body comprises one or more transactions. The header comprises the following fields: version, transaction number, time stamp, previous hash, Merkle root, target and nonce. A version indicates a version of rules that are used to validate the blockchain. A transaction number indicates the number of transactions contained in the body. A time stamp indicates a date and time of the last (more recent) transaction of the block. A previous hash is the hash of the previous block in the blockchain (null for the first, or genesis, block).

A Merkle root is the hash of the hashes of all the transactions of the block (constructed by pairing each transaction with another transaction and calculating the hash of their hashes and so on until all the transactions have been processed, with the last transaction that is paired with itself when the transactions are in odd number). A target indicates a maximum value that is acceptable for the hash of the header. A nonce is a value that is added to the hash of the header to make it lower than the target.

New transactions to be inserted into the blockchain are distributed into the network for the addition of corresponding new blocks to the blockchain. Every (full) node working on the addition of any new block to the blockchain have to solve a problem, which is a mathematical puzzle consisting in determining the nonce that makes the hash of the header of the new block lower than the target (which target is updated periodically to ensure an adequate difficulty of the mathematical puzzle). Since it is not possible to predict the hash of a number a priori, for this purpose it is necessary to iterate through every possible value of the nonce and to calculate the corresponding hash until it falls below the target (with the lower the target the more attempts are needed on the average to obtain the desired result thereby increasing the difficulty of the mathematical puzzle). The hash is calculated for the header only (independently of the body), which header has several easy-to-modify fields so that the node may work on the new block (or more of them at the same time) without waiting for all its transactions. The first node that solves the mathematical puzzle creates the new block by adding the corresponding new transactions to its body (after they have been successfully validated by the node) and the corresponding header (with the nonce so determined). This node then adds the new block to the blockchain and distributes the new block into the network. Every node receiving the new block defining a different version of the blockchain (with respect to the one stored therein) compares the scores of these versions of the blockchain; the score is defined by a cumulative effort required to create the blockchain (substantially corresponding to its length); if the score of the received version of the blockchain is higher than the score of the stored version of the blockchain (i.e., it is longer and then more difficult to create), the node validates the new block and, in case of positive result, adds the new block to the blockchain and distributes it again into the network (at the same time abandoning any working on the corresponding transactions). Because the blocks are linked in succession by their previous hashes, any (malicious) modification of a block would require the modification of all the blocks following it in the blockchain; however, because every node gives precedence to the longest version of the blockchain and because of the effort required to solve the mathematical puzzles required to add its blocks, the malicious modification would require a processing power comparable to the one spent by the whole network to expand the blockchain from the original version of this block up to its end (so that this becomes already very difficult when the original version of the block if followed by a few other blocks, unless a majority of the processing power of the network is acquired). In a permissionless (or public) blockchain no control exists on the access to the blockchain; in this case, a proof of work schema is implemented wherein the nodes that add new blocks to the blockchain (referred to as miners) are remunerated for their work in solving the corresponding mathematical puzzles. Conversely, in a permissioned (or private) blockchain the access to the blockchain is controlled by an owner of the network; in this case, the nodes that may add new blocks to the blockchain (referred to as validators) are vetted by the owner of the network.

In the context of the present disclosure, the transactions stored in the blockchain 125 relate to the accesses to the TV transmissions by the access devices 110,115 and the nodes of the network comprise the access devices 110,115. In an embodiment, the blockchain is permissioned, wherein the network comprises a (provider) system 130 of the provider and one or more validators 135 that have been vetted by the provider system 130 to add new blocks to the blockchain 125.

Figure 1C:
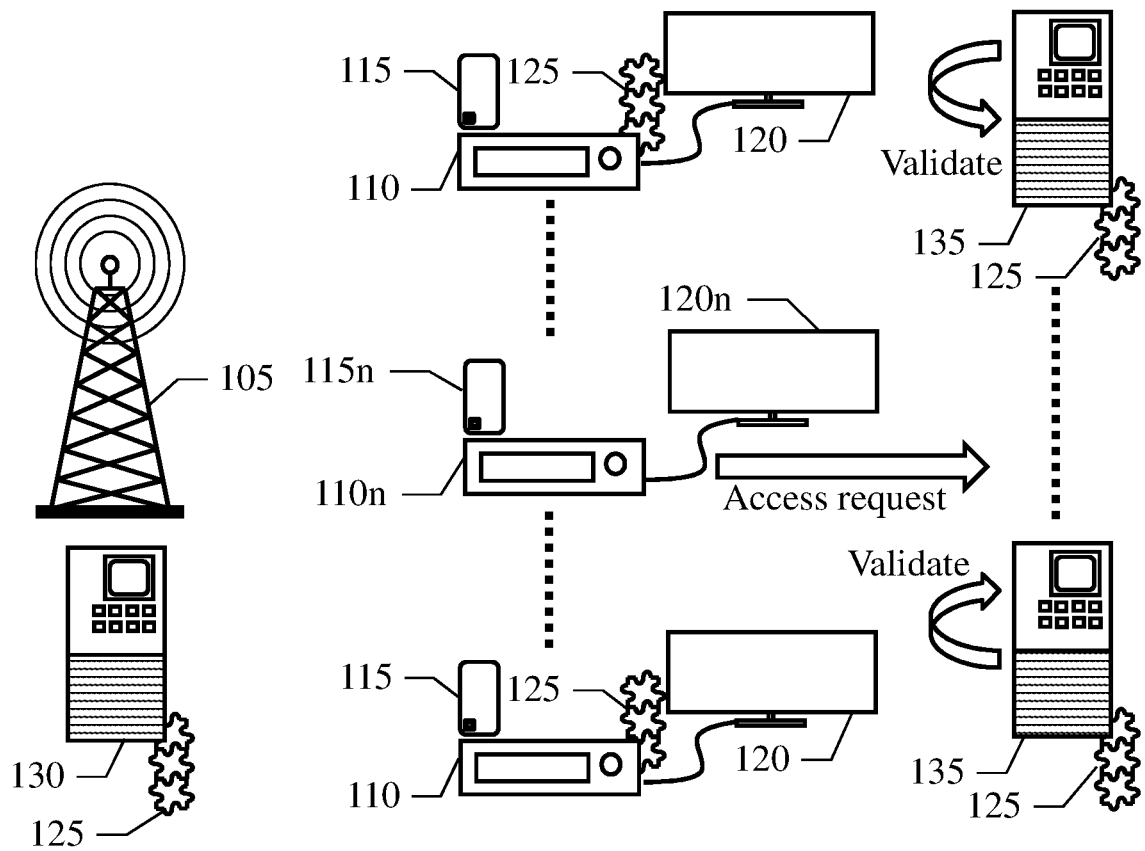

Moving to FIG. 1C, whenever a new access device (differentiated with the reference numerals 110n,115n) desires to access a TV transmission (or more) for its viewing onto a corresponding TV set (differentiated with the reference numeral 120n), the access device 110n,115n submits an access request to the validators 135. In response thereto, the validators 135 validate the access request according to corresponding authorizations to access the TV transmissions that have been granted by the provider system 130 to the access devices 110,115 (for example, comprised in the blockchain 125).

Figure 1D:
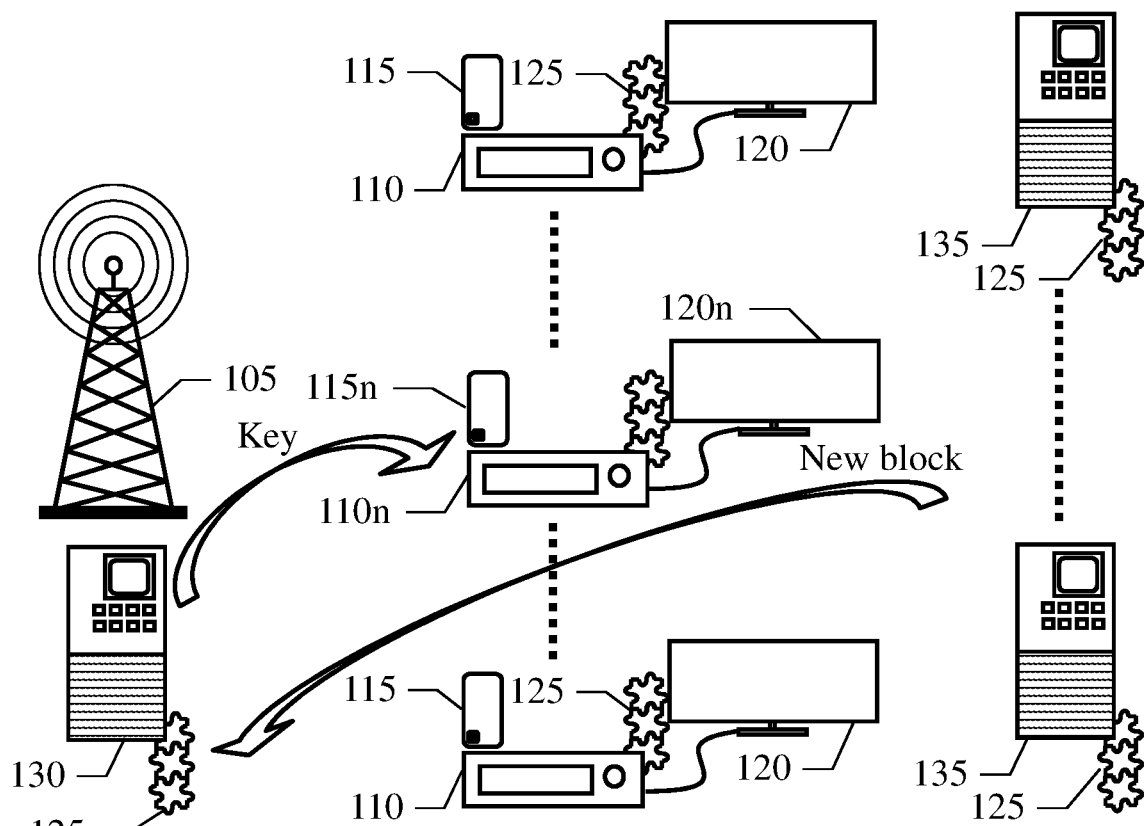

Moving to FIG. 1D, assuming that a consensus is reached by the validators 135 on a positive result of the validation of the access request, a new block with a transaction comprising an indication of the access request is added to the blockchain 125. In response thereto, the provider system 130 transmits cryptographic information for the TV transmission (for example, a first remote part of its transmission key, or simply remote key) to the access device 110n,115n. The access device 110n,115n may then decrypt the TV transmission according to the cryptographic information, for example, by using the remote key in combination with a second local part of the transmission key, or simply local key, stored in its smartcard 115n.

The above-described solution allows controlling the access to the TV transmissions in a very effective way.

Particularly, in this manner it is possible to prevent (or at least to hinder substantially) any interception of the transmission keys by fraudulent decoders for its distribution to other fraudulent decoders of unauthorized users to allow them viewing the TV transmissions illicitly. Likewise, it is possible to prevent (or at least to hinder substantially) any use of fraudulent smartcards, obtained by cloning an (authentic) smartcard, by corresponding unauthorized users to view the TV transmissions illicitly.

Moreover, it is possible to prevent (or at least to hinder substantially) any illicit sharing of the (authentic) smartcards, for example, the use of a smartcard of a (cheating) subscriber in the decoder of another subscriber or in an (unauthorized) condition.

All of the above is achieved with a collaborative approach, which provides a high level of security (thanks to the lack of any centralized point of vulnerability) at the same time with a high level of availability and performance (thanks to its distributed nature). Moreover, all of the above makes it possible to relax the (periodic) change of the transmission keys (with a beneficial effect on complexity and network traffic), for example, by making the changes less frequent.

The blockchain also logs all the accesses to the TV transmissions in a substantially permanent way. This information may then be used by the provider for auditing purposes (for example, to identify fraudulent decoders, fraudulent smartcards, and/or cheating subscribers).

Figure 2:
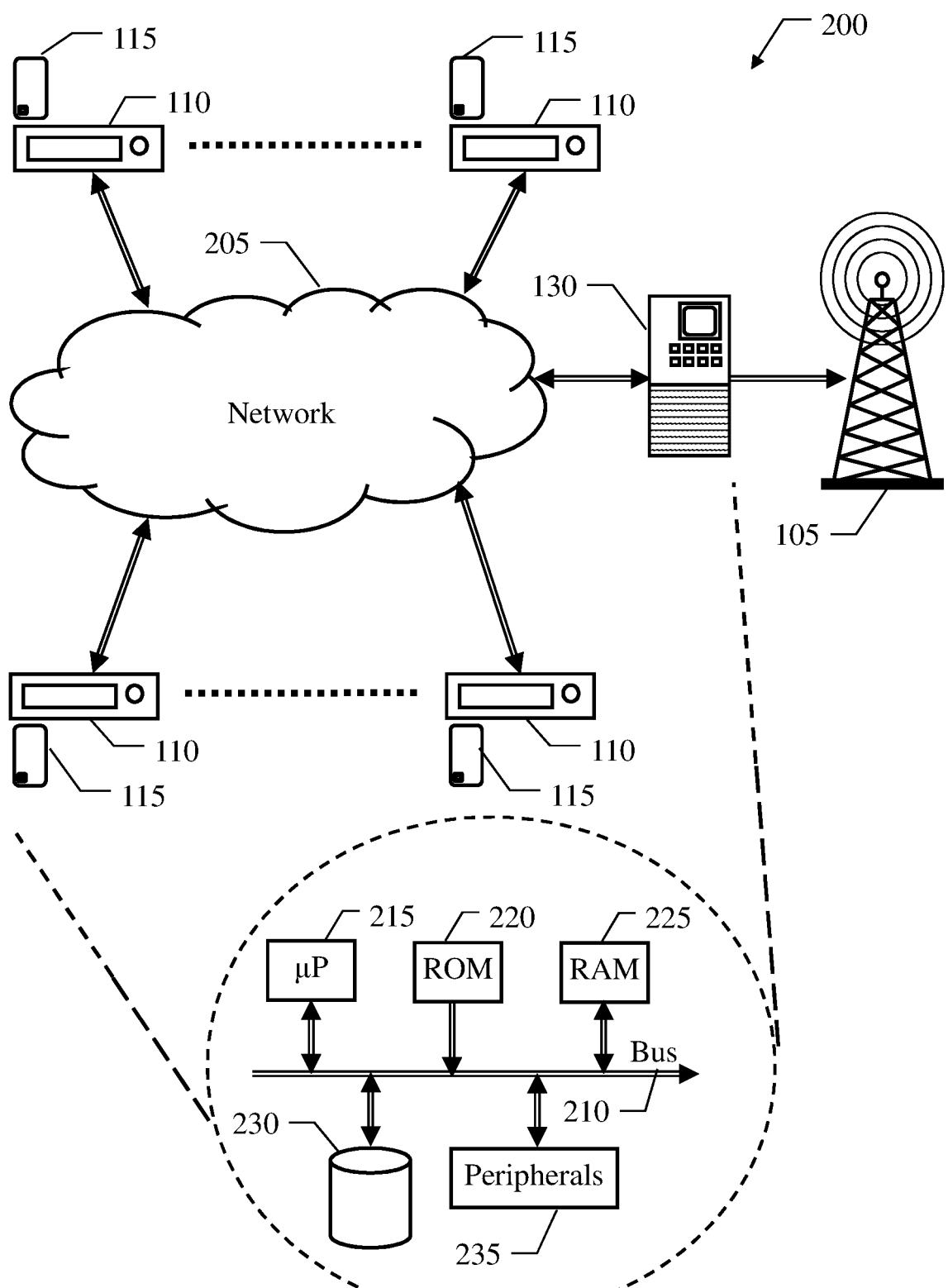
FIG. 2 shows a schematic block diagram of an infrastructure wherein the solution according to an embodiment of the present disclosure may be practiced.

With reference now to FIG. 2, a schematic block diagram is shown of an infrastructure 200 wherein the solution according to an embodiment of the present disclosure may be practiced.

The infrastructure 200 comprises (for each provider) its TV stations 105 (only one shown in the figure), the decoders 110 and the smartcards 115 of its subscribers (coupled with their TV sets, not shown in the figure), at least some of them further operating as validators, and its provider system 130. For example, the TV station 105 is formed by a radio antenna (mounted on top of a radio tower) that receives the (encrypted) TV transmissions (in the form of corresponding digital data streams) from a control center of the provider and broadcasts them over the air (modulated in analog form onto corresponding TV channels) via a network of radio repeaters. The provider system 130 is implemented by one or more server computing machines, or simply servers, that are part of the control center of the provider. Each decoder 110 is a Set Top Box (STB) that has a slot for inserting the smartcard 115, a TV tuner for receiving the (encrypted) TV transmissions, an output port for providing the (decrypted) TV transmissions (in the form of a digital TV signal) to the TV set and a control unit for controlling its operation. Each smartcard 115 is a plastic support with the shape of a bank card that embeds a control unit and is provided with a set of contacts for connecting to the decoder 110.

The decoders 110 and the provider system 130 are connected to a (telecommunication) network 205 for communicating among them in a secure way (providing authentication, integrity and confidentiality). For example, the network 205 is a Virtual Private Network (VPN) that is implemented by the provider system 130 over the Internet. In this way, it is very difficult (in not impossible) to connect to the VPN by any fraudulent decoders or to sniff any communications over the VPN.

Each of the above-mentioned computing machines (decoders 110, smartcards 115 and provider system 130) comprises several units that are connected among them through a bus structure 210 with one or more levels (with an architecture that is suitably scaled according to the type of the computing machine 110,115,130). Particularly, one or more microprocessors (μP) 215 control operation of the computing machine 110-115,130; the microprocessors 215 may comprise a cryptographic co-processor (or more) for performing cryptographic operations. A non-volatile memory (ROM) 220 stores basic code for a bootstrap of the computing machine 110,115,130 and a volatile memory (RAM) 225 is used as a working memory by the microprocessors 215. The computing machine 110,115,130 is provided with a mass-memory 230 for storing programs and data, for example, hard disks for the decoders 110, flash $E^2$PROMs for the smartcards 115 and storage devices of one or more data centers wherein the servers of the provider system 130 are implemented. Moreover, the computing machine 110,115,130 comprises a number of controllers for peripherals, or Input/Output (I/O) units, 235. For example, the peripherals 235 of each decoder 110 comprise one or more control buttons, an infrared port for receiving commands from a remote control, the slot for the smartcard, the TV tuner, the output port for the TV set and a network adapter for accessing the network 205, the peripherals 235 of each smartcard 115 comprise its contacts and the peripherals 235 of each server of the provider system 130 comprise a network adapter for plugging the server into the corresponding data center and then connecting it to a console of the data center (for example, a personal computer, also provided with a controller for reading/writing removable storage units such as optical disks, like DVDs) and to a switch/router sub-system of the data center for its access to the network 205.

Figure 3:
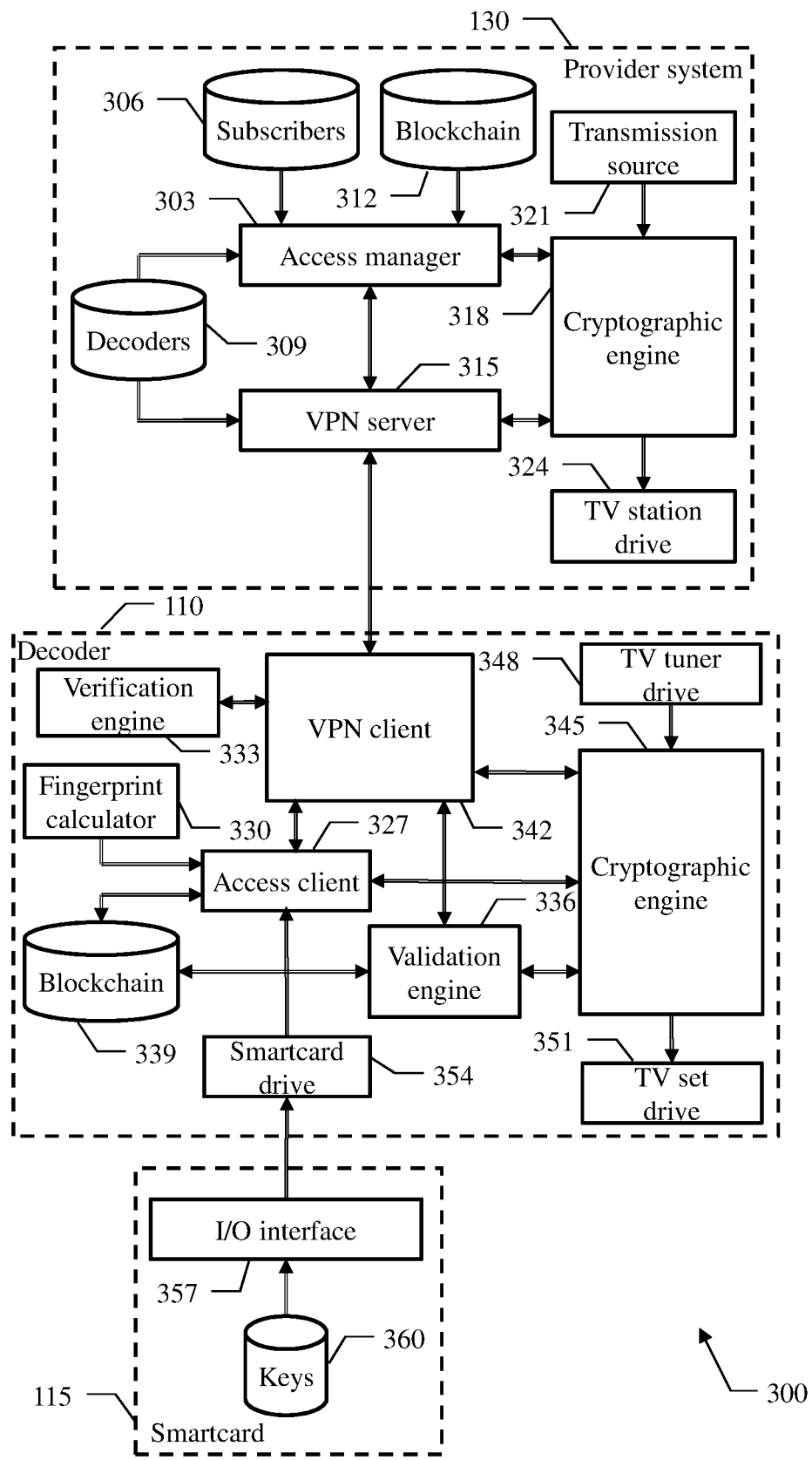
FIG. 3 shows the main software components that may be used to implement the solution according to an embodiment of the present disclosure.
Figure 4A:
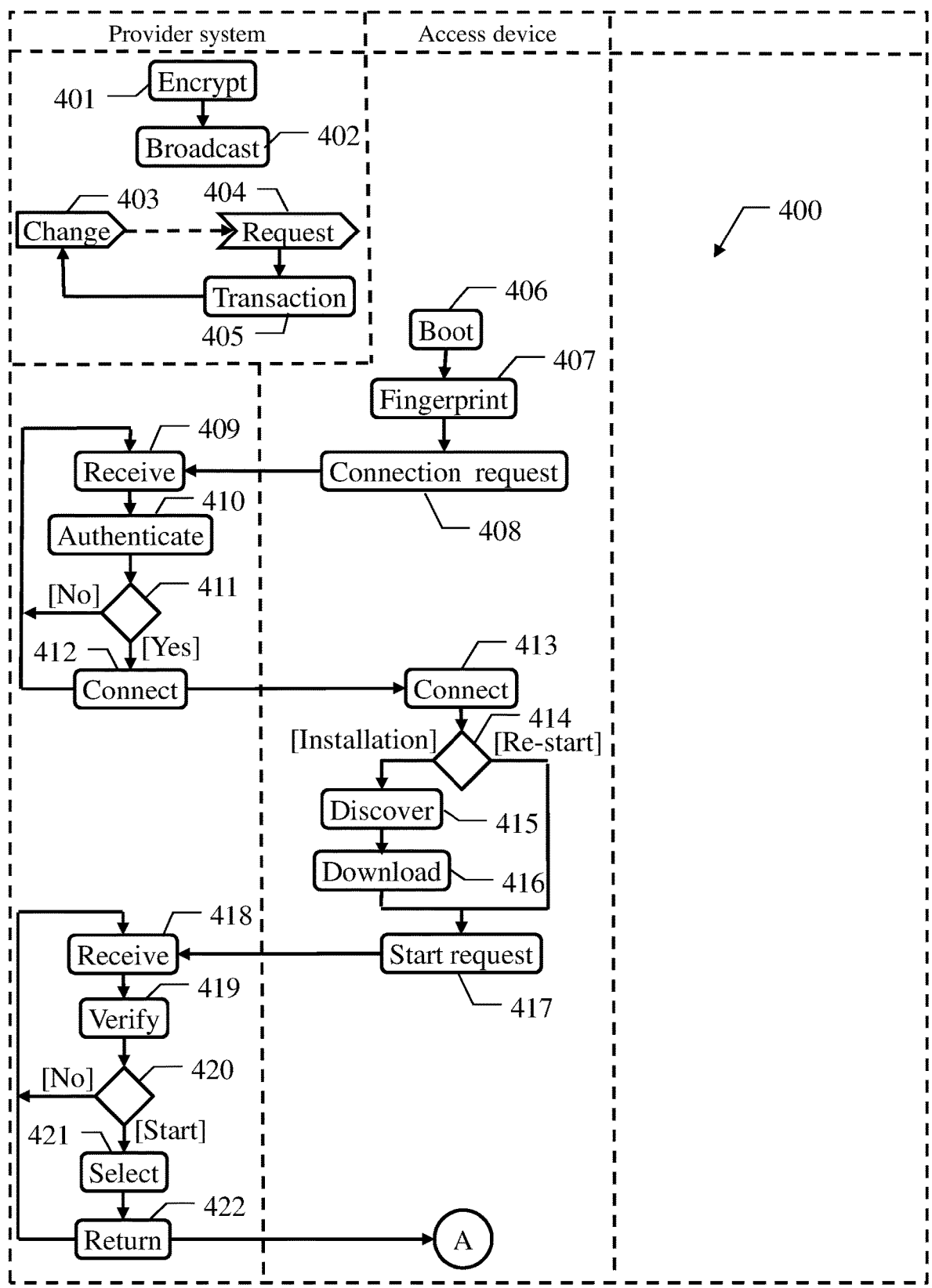
FIG. 4A-FIG. 4D shows an activity diagram describing the flow of activities relating to an implementation of the solution according to an embodiment of the present disclosure.
Figure 4B:
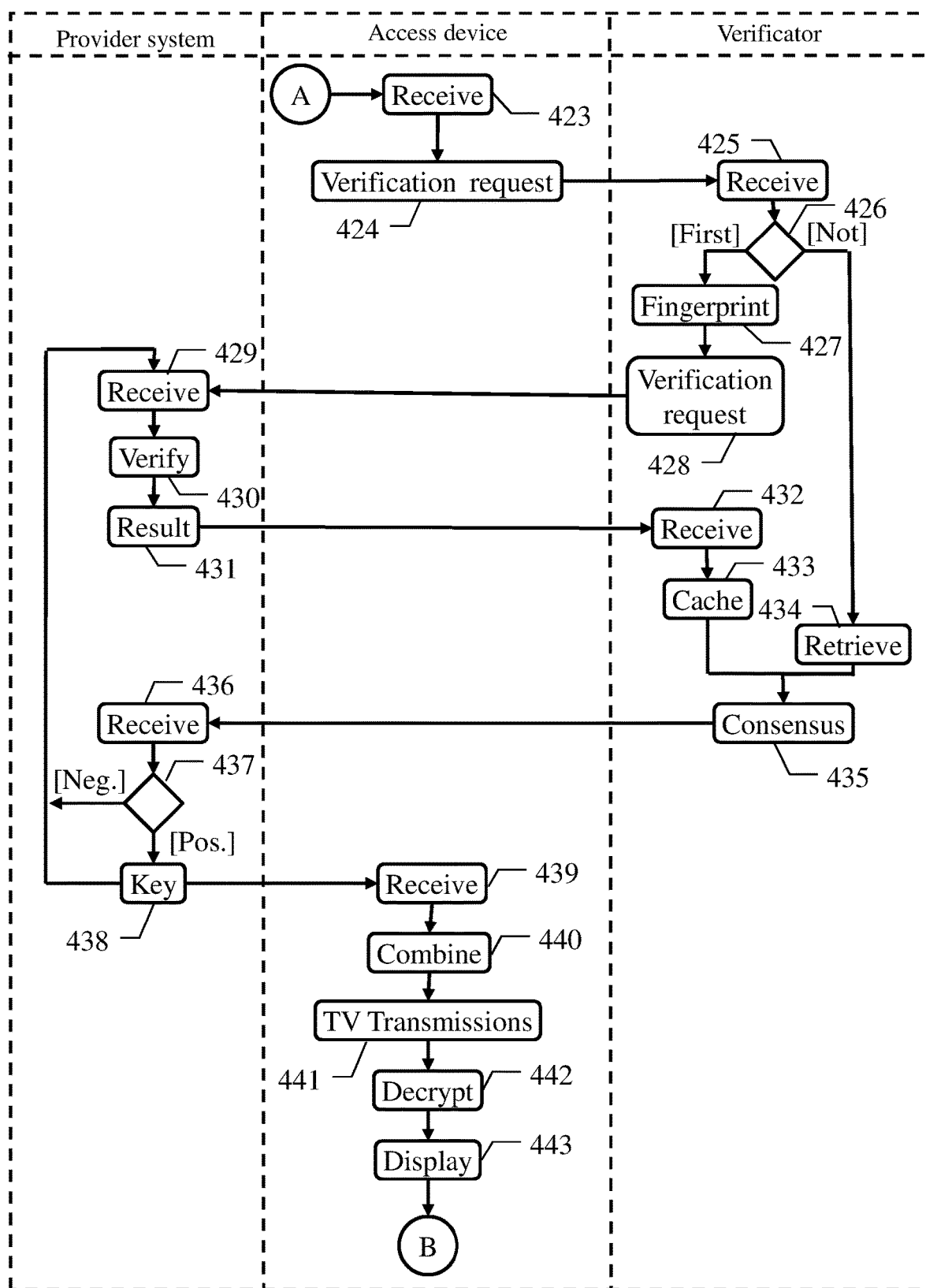
Figure 4C:
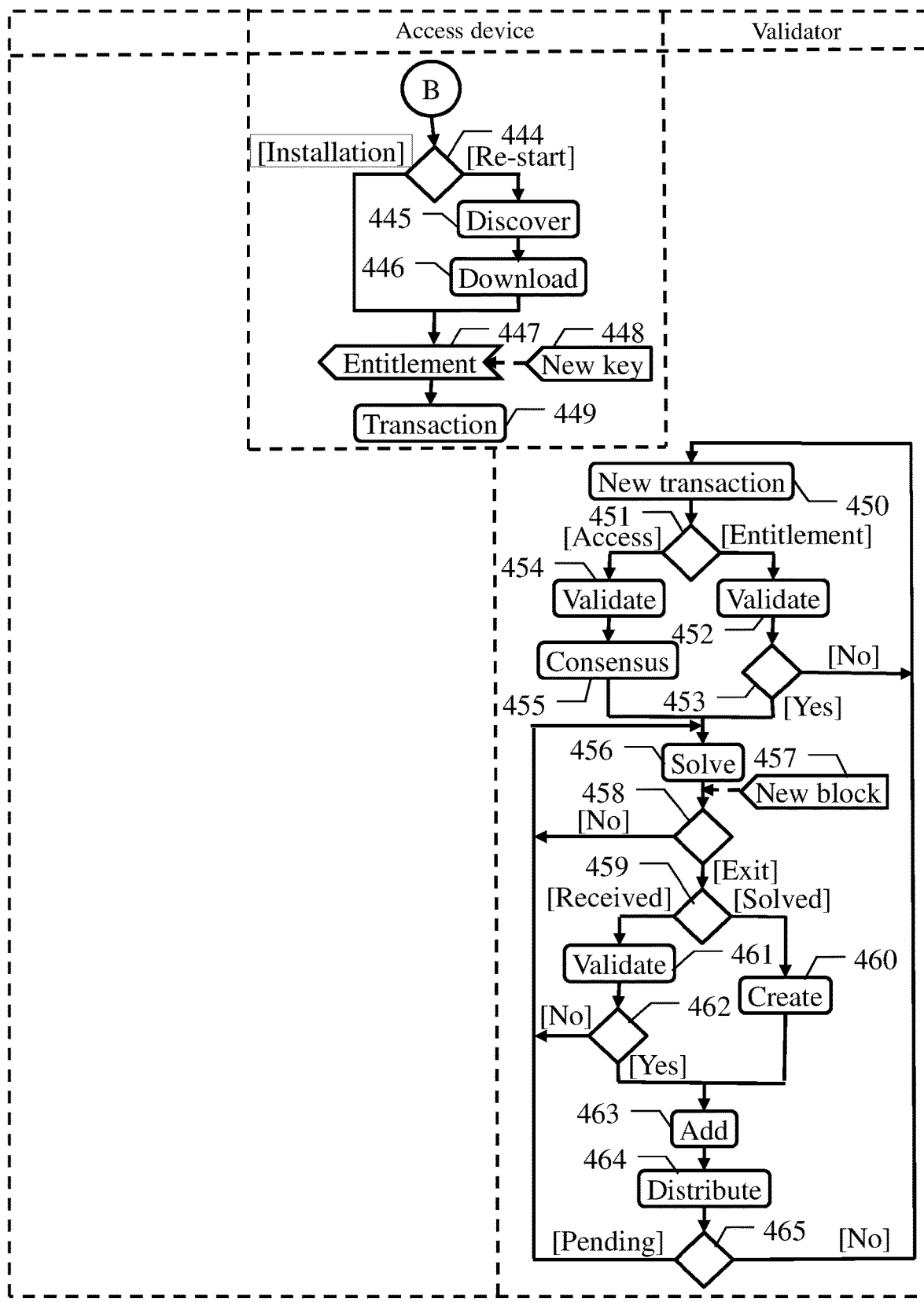
Figure 4D:
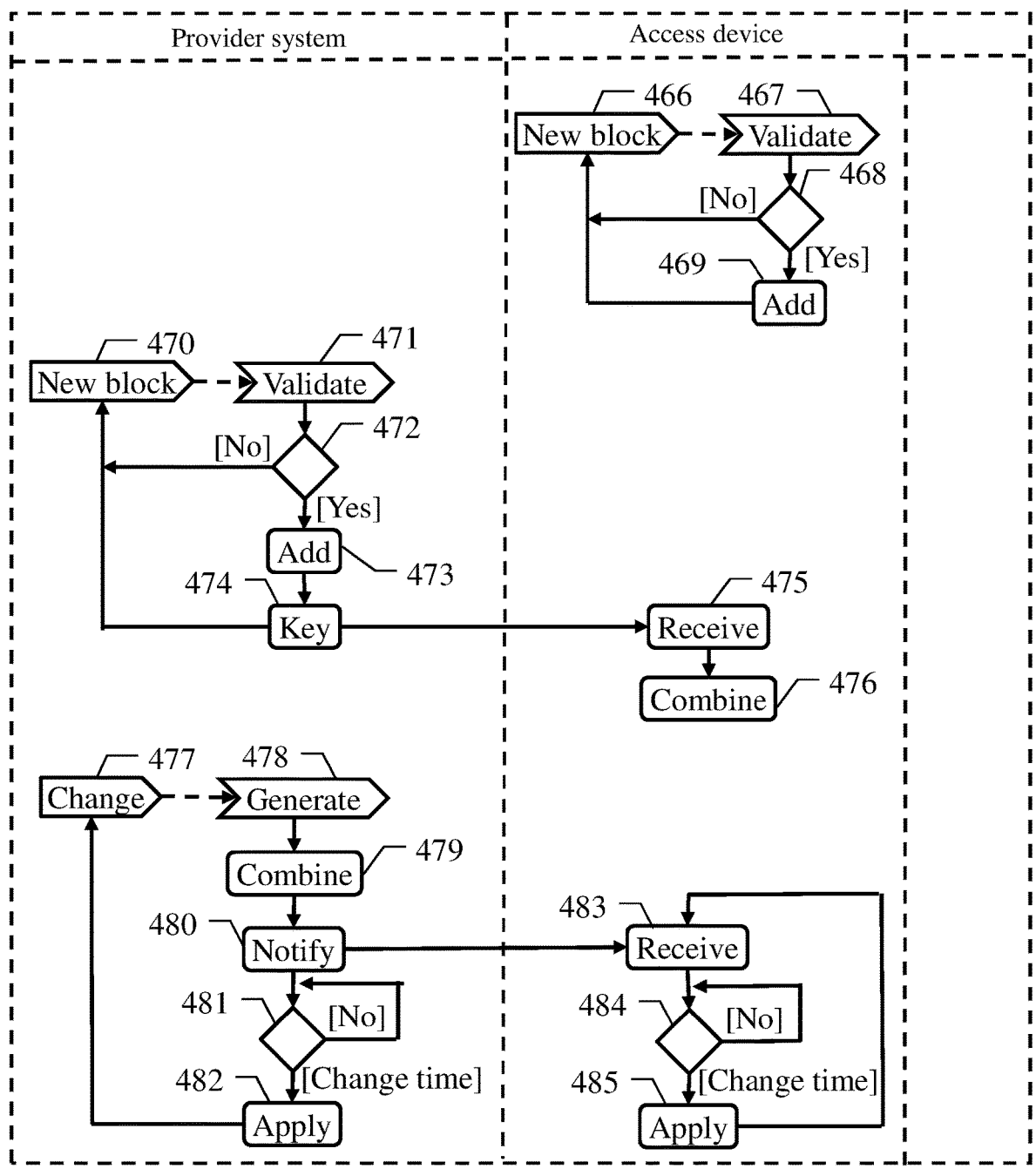

With reference to FIG. 3, the main software components are shown that may be used to implement the solution according to an embodiment of the present disclosure.

Particularly, all the software components (programs and data) are denoted as a whole with the reference 300. The software components are typically stored in the mass memory and loaded (at least in part) into the working memory of the corresponding computing machines when the programs are running, together with corresponding operating systems and possible other application programs (not shown in the figure). The programs are initially installed into the mass memory, for example, from removable storage units or from the network. In this respect, each program may be a module, segment or portion of code, which comprises one or more executable instructions for implementing the specified logical function.

Starting from the provider system 130, it comprises the following software components.

An access manager 303 manages the access to the TV transmissions. The access manager 303 accesses (in read mode) a subscriber registry 306. The subscriber registry 306 stores information relating to the subscribers of the provider. Particularly, the subscriber registry 306 has a record for each subscriber. The record comprises a (unique) identifier of the subscriber, his/her personal information such as name, address, telephone number, e-mail address (provided that the subscriber has given the required consent) and a public key of the subscriber. The record also comprises an entitlement of the subscriber to view the TV programs. The entitlement is defined by (unique) identifiers of one or more decoders and (unique) identifiers of one or more smartcards provided to the subscriber, which smartcards are associated with corresponding contracts indicating a (unique) identifier of a set of TV transmissions that the subscriber is authorized to view in a specific condition. For example, each contract authorizes the subscriber to view a single TV channel or a bouquet of TV channels (such as dedicated to entertainment, sports, etc.) in domestic or public environment for a period, such as every month, subject to the payment of a corresponding subscription fee. For example, the subscriber registry 306 is maintained by an accounting system of the provider (not shown in the figure), which adds new subscribers, updates their personal information and entitlements, records their payments and issues corresponding invoices.

The access manager 303 also accesses (in read mode) a decoder registry 309. The decoder registry 309 stores information relating to the decoders 110 of the provider. Particularly, the decoder registry 309 has a record for each decoder 110. The record comprises the identifier and a public key of the decoder 110. The record also comprises a (known) fingerprint of the decoder 110. The fingerprint is based on one or more characterizing features defined by physical properties that characterize the decoder 110 The characterizing features are substantially unpredictable, so as to make it very difficult (if not impossible) to reproduce the same characterizing features in different decoders. For example, the characterizing features are inherently random values of one or more components of the decoder 110, such as their material or manufacturing processes/systems. Suitable candidates for the characterizing features are wire/gate delays of integrated circuits. Moreover, the record comprises a validator flag that is asserted when the decoder 110 further operates as validator. For example, the decoder registry 309 is maintained by a procurement system of the provider (not shown in the figure) that adds/deletes the decoders 110, and by an administration system of the provider (not shown in the figure) that vets the decoders 110 as validators. Moreover, the access manager 303 accesses (in read/write mode) a blockchain repository 312, which stores a version of the blockchain that is currently known to the provider system 130.

The access manager 303 interacts with a VPN server 315, which implements a VPN for communicating among nodes defined by the provider system 130 and the decoders 110 (by maintaining a list of network addresses and public keys of the decoders that are currently connected to the VPN). The VPN server 315 accesses (in read mode) the decoder registry 309. Both the access manager 303 and the VPN server 315 interact with a (central) cryptographic engine 318, which performs cryptographic operations based on a Public Key Infrastructure (PKI). The PKI leverages an asymmetric encryption technique involving the use of pairs of keys, each formed by a (non-confidential) public key and a (confidential) private key that are generated so that it is computationally unfeasible to obtain the private key from the public key; each (public/private) key may be used to encrypt a message (into an apparently unintelligible form), with the other key that may then be used to decrypt the encrypted message (to restore its original form). The cryptographic engine 318 has hardcoded therein (in a protected way) a pair of public key and private key of the provider system 130. The cryptographic engine 318 also stores (in a protected way) one or more local keys used to encrypt the TV transmissions (for example, a single local key the same for all the TV transmissions). Moreover, the cryptographic engine 318 maintains a list of the transmission keys (with their remote keys) associated with the identifiers of the sets of TV transmissions that the system provider 130 may authorize to view. The encryption engine 318 is coupled with a TV transmission source 321, for example, implemented by one or more production systems (not shown in the figure) of the provider, for receiving the TV transmissions to be broadcast. The encryption engine 318 controls a TV station drive 324, which drives the TV stations of the provider (not shown in the figure) to broadcast the TV transmissions in encrypted form.

Moving to each decoder 110 (only one shown in the figure), it comprises the following software components.

An access client 327 is used to access the TV transmissions (which the corresponding subscriber is authorized to view). The access client 327 has hardcoded therein the identifier of the decoder 110. The access client 327 exploits a fingerprint calculator 330, which calculates the fingerprint of the decoder 110, by exploiting one or more probes (not shown in the figure) for measuring the corresponding characterizing features of the decoder 110. A verification engine 333 verifies (in a fast way) the other decoders when they turn-on. The verification engine 333 maintains a verification cache. The verification cache has a record for any other decoder that has already been verified wherein the record comprises the identifier of the other decoder and a result of its verification (positive/negative). When the decoder 110 may further operate as validator, a validation engine 336 validates any new transactions for the addition of corresponding new blocks to the blockchain. Both the access client 327 and the validation engine 336 access (in read/write mode) a blockchain repository 339, which stores a version of the blockchain that is currently known to the decoder 110.

The access client 327, the verification engine 333 and the validation engine 336 interact with a VPN client 342, which is used to communicate over the VPN implemented by the provider system 130 (by interacting with its VPN server 315). The VPN client 342 stores the network address and the public key of the provider system 130 Moreover, the VPN client maintains a list of network addresses, public keys and validator flags of the other decoders that are currently connected to the VPN. The access client 327, the validation engine 336 and the VPN client 342 interact with a (local) cryptographic engine 345. The cryptographic engine 345 has hardcoded therein (in a protected way) a pair of public key and private key of the decoder 110. Moreover, the cryptographic engine 345 maintains the transmission key associated with the identifier of the set of TV transmissions to be decrypted. The encryption engine 345 is coupled with a TV tuner drive 348 for receiving the (encrypted) TV transmissions that are broadcast by the provider system 130. The encryption engine 345 controls a TV set drive 351, which drives the TV set (not shown in the figure) by providing it the (decrypted) TV transmissions for their viewing thereon. The access client 327 exploits a smartcard drive 354, which drives the smartcard 115 inserted into the decoder 110.

Moving to each smartcard 115 (only one shown in the figure), it comprises the following software components. An I/O interface 357 is used to exchange information between the smartcard 115 and the decoder 110 (by interacting with its smartcard drive 354). The I/O interface 357 has hardcoded therein the identifier of the smartcard 115. The I/O interface 357 accesses (in read mode) a key repository 360, which stores (in a protected way) a pair of public key and the private key of the corresponding subscriber and the local key.

With reference now to FIG. 4A-FIG. 4D, an activity diagram is shown describing the flow of activities relating to an implementation of the solution according to an embodiment of the present disclosure.

Particularly, the activity diagram represents an exemplary process that may be used to control the access to the TV transmissions with a method 400. In this respect, each block may correspond to one or more executable instructions for implementing the specified logical function on the control server.

Starting from the swim-lane of the provider system, in operation the TV transmission source at block 401 continually receives the TV transmissions to be broadcast. Concurrently, the cryptographic engine encrypts the TV transmissions with their transmission keys. The cryptographic engine at block 402 passes the (encrypted) TV transmissions to the TV station drive that broadcasts them over the air continuously.

Meanwhile, any change may be applied to the subscribers in the corresponding registry by the accounting system (for example, with the addition/modification/removal of a subscriber, the addition/removal of a decoder, the addition/removal of a smartcard or any modification of its contract). As soon as the access manager determines the change (for example, by monitoring the subscriber registry or in response to a corresponding notification) the process passes from block 403 to block 404. In response thereto, the access manager creates a corresponding entitlement request for updating the blockchain accordingly. The entitlement request indicates the change; in case the change comprises any personal information of the subscriber, the personal information is encrypted with the public key of the subscriber (retrieved from the subscriber repository) to ensure its confidentiality. The access manager at block 405 creates a new transaction for the entitlement request, signed with the private key of the provider system (via the cryptographic engine), and distributes it into the VPN (via the VPN server). The process then returns to the block 403 waiting for the application of any further change to the subscribers.

Moving to the swim-lane of each access device formed by a decoder with its smart card (only one shown in the figure), the decoder turns on at block 406. Once a boot of the decoder has been completed, the fingerprint calculator at block 407 calculates the (actual) fingerprint of the decoder; for this purpose, the fingerprint calculator measures the characterizing features of the decoder defining it (via the corresponding probes) and combines them into the actual fingerprint (for example, by setting the actual fingerprint equal to the product of the characterizing features). In this way, since the characterizing features of the decoder (substantially unpredictable) are measured in real-time, even if the decoder should be cloned it would be very difficult, if not impossible, to obtain the same actual fingerprint (which may not be copied since it is not stored anywhere in the decoder). The access client at block 408 commands the VPN client to submits a connection request over the Internet to the network address of the provider system for connecting to the VPN. The connection request indicates the identifier, the fingerprint and the public key of the decoder and it is signed with the private key of the decoder (via the cryptographic engine). In the swim-lane of the provider system, the VPN server is in a listening condition at block 409 for any connection requests. As soon as the VPN server receives the above-mentioned connection request from the decoder, the VPN server at block 410 authenticates the decoder, by verifying the signature of the connection request with the public key of the decoder associated with its identifier in the decoder repository (via the cryptographic engine) and, in case of positive result of this operation, by verifying whether the actual fingerprint matches (for example, it is the same as) the known fingerprint of the decoder (contained in the decoder registry as indicated by its identifier). If both the signature is correct and the actual fingerprint matches the known fingerprint, the result of the authentication is positive. Conversely (meaning that the decoder has been cloned), the result of the authentication is negative.

The flow of activity branches at block 411 according to the result of the authentication. In case of negative result of the authentication, the process directly returns to the block 409. In this way, the connection request is refused (with the possibility of logging the refused connection request for auditing purposes), thereby ensuring that only authentic decoders may connect to the VPN. Conversely, in case of positive result of the authentication, the VPN server at block 412 connects the decoder to the VPN, by adding its network address and public key to the corresponding list and sending an acknowledgment to the decoder, comprising the public key of the provider system (in order to establish a cryptographic tunnel between the provider system and the decoder via their public/private keys for any next communications between them) and the validator flag of the decoder (to set it as a validator when asserted). The process then returns to the block 409. Referring again to the swim-lane of the access device, in response to the acknowledgment of its connection to the VPN, the VPN client at block 413 saves the public key of the provider system that has been received therefrom.

At this point, the decoder has no transmission key (at its installation) or it is very likely to have an old version of the transmission key for the corresponding set of TV transmissions (at its re-start after a turn-off). Therefore, the above-mentioned procedure should be performed to obtain the current version of the transmission key using the blockchain (with the addition of a corresponding new block thereto). However, this operation may be relatively long (for example, up to several minutes), during which no TV transmissions may be viewed. Therefore, as a further improvement, an embodiment of the present disclosure provides a faster procedure for obtaining the current version of the transmission key, especially at every re-start of the decoder.

For this purpose, the flow of activity branches at block 414 according to the type of turn-on of the decoder. If the decoder has just been installed for the first time, the VPN client at block 415 starts a discover process of the other decoders that are currently connected to the VPN. For example, the decoder requests the list of network addresses and public keys of the other decoders, or part thereof, to the provider system and then requests the network addresses and public keys of the other decoders to each of them, with the process that is reiterated by every decoder so as to make it aware of all the other decoders of the VPN (with their network addresses and public keys that are added to the corresponding list) in a completely distributed way. The access client at block 416 downloads the blockchain (into the corresponding repository). For example, the decoder submits a synchronization request to the network address of another decoder of the VPN, by passing an indication of the last block of its current version of the blockchain (in this case equal to the genesis block being hardcoded), so as to cause the other decoder to return the blocks following this last block in its version of the blockchain (in a block-first method) or simply their headers (in a header-first method). In the block-first method the decoder validates the received blocks and add them to its version of the blockchain in case of positive result of this operation, whereas in the header-first method the decoder validates the received headers and in case of positive result of this operation downloads the corresponding blocks as above in parallel from one or more other decoders.

Once this operation has been completed, the process descends into block 417. The same point is also reached directly from the block 414 when the decoder has been re-started after its turn-off. In both cases, the access client submits a start request to the network address of the provider system over the VPN (via the VPN client). The start request comprises the identifier of the decoder and the identifier of the set of TV transmissions for which the transmission key is required. In case the decoder has just been installed, the identifier of the set of TV transmissions is retrieved from the blockchain (as described in the following), whereas in case the decoder has been re-started the identifier of the set of TV transmissions is already available to the cryptographic engine in association with the old version of the corresponding transmission key. In the swim-lane of the provider system, the access manager is in a listening condition at block 418 (via the VPN client) for any start requests. As soon as the access manager receives the above-mentioned start request from the decoder, the access manager at block 419 verifies whether the decoder has actually just started. For example, in case a previous start request has already been received from the same decoder (as indicated in a corresponding variable), the access manager verifies whether the blockchain has a block containing a corresponding transaction with its timestamp following a time of the previous start request (indicated in the same variable). The flow of activity branches at block 420 according to a result of this operation. In case no corresponding block has been found in the blockchain between the two start requests, it is very likely that the decoder is illicitly trying to obtain the transmission key continually without using the blockchain. Therefore, the process directly returns to the block 418 (thereby discarding the start request, with the possibility of logging it for auditing purposes). Conversely, if the corresponding block has been found in the blockchain between the two start requests (or in any case after a predetermined delay from the previous start request to allow recovering operation of the decoder in case of accidental turn-off after submission of the start request but before submission of a new transaction for creating the corresponding new block), the process continues to block 421.

At this point, the access manager selects a plurality of other decoders (from the corresponding list maintained by the VPN server) to operate as verificators of the decoder. For example, the verificators are a predetermined number of other decoders (such as 10-20) that are closest to the decoder (according to their network addresses). The access manager at block 422 returns a list of the network addresses of the verificators (extracted from the corresponding list maintained by VPN server) to the decoder over the VPN (via the VPN server). The process then goes back to the block 418. Referring again to the swim-lane of the access device, the access client at block 423 receives the list of network addresses of the verificators over the VPN (via the VPN client). The access client at block 424 submits a verification request of the decoder to the network address of each verificator over the VPN (via the VPN client). The verification request comprises the identifier and the fingerprint of the decoder (together with a total number of the verificators).

Moving to the swim-lane of each verificator (only one shown in the figure), the verification engine at block 425 receives the verification request over the VPN (via the VPN client). The flow of activity branches at block 426 according to a number of times the same verification request has been received by the verificator. If this is the first time that the verificator receives the verification request from this decoder (as indicated by a lack of a corresponding record in the verification cache), the fingerprint calculator at block 427 calculates the (actual) fingerprint of the verificator as above. The verification engine at block 428 submits a corresponding (further) verification request to the provider system over the VPN (via the VPN client); the verification request comprises the identifier and the fingerprint of the decoder and the identifier and the fingerprint of the verificator. In the swim-lane of the provider system, the access manager is in a listening condition at block 429 (via the VPN server) for any verification requests. As soon as the access manager receives the above-mentioned verification request from the verificator, the access manager at block 430 determines a result of the verification of the corresponding fingerprints. For this purpose, the access manager compares the actual fingerprint of the decoder and the actual fingerprint of the verificators with their known fingerprints (contained in the decoder registry as indicated by the corresponding identifiers). If both the actual fingerprints match the corresponding known fingerprints (meaning that both the decoder and the verificators are authentic) the result of the verification is positive. Conversely, if at least one of the actual fingerprints does not match the corresponding known fingerprint (meaning that the decoder and/or the verificator have been cloned) the result of the verification is negative (with the possibility of logging the identifier of each cloned decoder/verificator for auditing purposes).

The use of both the fingerprints increases the security level; indeed, in this way the decoder is determined to be authentic only when it is so and the corresponding request has been submitted by an authentic decoder (operating as verificator) as well. The access manager at block 431 returns the result of the verification (positive/negative for the decoder and the verificator) to the verificator over the VPN (via the VPN server).

Referring back to the swim-lane of the verificator, the verificator engine at block 432 receives the result of this verification over the VPN (via the VPN client). The verificator engine at block 433 sets a result of the verification of the decoder equal to the received value and saves it in association with the identifier of the decoder into the verification cache. Returning to the block 426, if the verificator has already received the verification request from the same decoder in the past (as indicated by a corresponding record that is available in the verification cache), the verification engine at block 434 directly retrieves the corresponding result from the verification cache. The flow of activity merges again at block 435 from either the block 433 or the block 434.

At this point, the verificator engine starts a process for determining a consensus among the verificators on the result of the verification. For example, this process is a based on a Byzantine fault-tolerant algorithm, wherein the validator distributes a consensus message indicating its result of the verification into the VPN. Each verificator receiving the consensus message without its result of the verification adds it (if possible) and re-distributes the consensus message into the VPN. As soon as a verificator detects that the consensus message indicates that a predefined majority of the verificators (for example, ⅔ of their total number as indicated in the verification request) have provided the same result of the verification (positive or negative), this verificator notifies the agreed upon result of the verification to the provider system over the VPN (via the VPN client). Returning to the swim-lane of the provider system, the access manager at lock 436 receives the (agreed upon) result of the verification from a verificator over the VPN (via the VPN server). The flow of activity branches at block 437 according to the result of the verification. If the result of the verification is negative, the process directly returns to the block 436. In this way, the start request is refused (with the possibility of logging the refused start request for auditing purposes), thereby ensuring that only authentic decoders may start viewing the TV transmissions at their turn-on. Conversely, if the result of the verification is positive the access manager at block 438 retrieves the remote key associated with the identifier of the set of TV transmissions indicated in the start request (from the cryptographic engine) and transmits it to the decoder over the VPN (via the VPN server). The process then goes back to the block 436.

Returning to the swim-lane of the access device, the access client at block 439 receives the remote key over the VPN (via the VPN client). The access client at block 440 retrieves the local key from the smartcard (via the smartcard drive that requests it to the I/O interface, which in turn retrieves it from the key repository). The access client passes the remote key and the local key to the cryptographic engine, which combines them into the transmission key and saves it (in association with the identifier of the set of TV transmissions). The TV tuner drive at block 441 starts receiving a selected one of the (encrypted) TV transmissions and passes it to the cryptographic engine. Assuming that the (selected) TV transmission belongs to the set of TV transmissions associated with the transmission key that has just been obtained, the cryptographic engine at block 442 decrypts the TV transmission with it (so as to restore its original form) and passes the (decrypted) TV transmission to the TV set drive. The TV set drive at block 443 sends the TV transmission to the TV set for its display.

As a result, the subscriber may start viewing the TV transmissions quickly when the decoder is turned-on. Indeed, apart when the decoder is installed for the first time, this only requires the reaching of the consensus on its verification by the verificators (which operation is far faster than updating the blockchain). Moreover, apart from the first time, each verificator retrieves the result of the verification of the decoder from the verification cache (without any need of involving the provider system). Therefore, the operation is very fast and completely distributed.

At this point, the decoder may start working normally. Particularly, the flow of activity branches at block 444 according to the type of turn-on of the decoder. If the decoder has been restarted after its turn-off, the VPN client at block 445 starts a discover process of the other decoders that are currently connected to the VPN as above. The access client at block 446 downloads the up-to-date version of the blockchain (into the corresponding repository) in a similar way as above. Once this operation has been completed, the process descends into block 447. The same point is also reached directly from the block 444 if the decoder has been installed for the first time. Moreover, the process passes to the block 447 from block 448 whenever the decoder receives a change notification from the provider system indicating that the remote key is going to be changed (as described in the following). At this point, the access client retrieves the identifier of the smartcard (via the smartcard drive that requests it to the I/O interface); the access client searches the up-to-date version (in the most recent blocks of the blockchain in the corresponding repository) of the entitlement of the subscriber, corresponding to the identifier of the decoder and the identifier of the smartcard so as to determine the identifier of the set of TV transmissions that the subscriber is authorized to view with this decoder and this smartcard. In case the entitlement comprises any personal information of the subscriber, the personal information is decrypted with the private key of the subscriber retrieved from the smartcard as well (via the smartcard drive that requests it to the I/O interface, which in turn retrieves it from the key repository). The access client creates a corresponding access request for accessing the set of TV transmissions so determined. The access request indicates the identifier of the decoder, the identifier of the smartcard and the identifier of the set of TV programs. The access client at block 449 creates a new transaction for the access request, signed with the private key of the decoder (via the cryptographic engine), and distributes it into the VPN (via the VPN client).

Moving to the swim-lane of each decoder further operating as validator (only one shown in the figure), the validation engine is in a listening condition at block 450 (via the VPN client) for any new transactions. As soon as the validation engine receives a new transaction, the process descends into block 451. At this point, the flow of activity branches according to the type of the new transaction. Particularly, if the new transaction comprises an entitlement request the blocks 452-453 are executed, whereas if the new transaction comprises an access request the blocks 454-455 are executed; in both cases, the process merges again at block 456.

With reference now to the block 452 (entitlement request), the validation engine validates the new transaction. Particularly, the validation engine verifies the signature of the new transaction with the public key of the provider system provided by the VPN client (via the cryptographic engine) to confirm its authenticity. The flow of activity branches at block 453 according to a result of this operation. In case of negative result of the validation of the new transaction, the process directly returns to the block 450 (thereby discarding it). Conversely, in case of positive result of the validation of the new transaction, the process descends into the block 456.

With reference instead to the block 454 (access request), the validation engine again validates the new transaction. As above, the validation engine verifies the signature of the new transaction with the public key of the decoder provided by the VPN client (via the cryptographic engine). However, in case of positive result of this operation, the validation engine further verifies whether the access request is compliant with the up-to-date version (in the most recent blocks of the blockchain in the corresponding repository) of the entitlement of the subscriber corresponding to the identifier of the decoder and the identifier of the smartcard. If the access request is both authentic and compliant, the result of the validation is positive. Conversely, if the new transaction is not authentic (meaning that the decoder has been cloned) or the access request is not compliant (meaning that the smartcard has been cloned or the subscriber is trying to use it in a condition different from the authorized one) the result of the validation is negative. The validation engine at block 455 starts a process as above for determining a consensus among the validators on the result of the validation (positive or negative); as soon as the consensus has been reached by a predefined majority of the validators (for example, ⅔ of their total number as indicated by the validator flags that are asserted in the list managed by the VPN client) on the same result of the validation (positive or negative), the process descends into the block 456.

Considering now the block 456, the validation engine starts (in case it is not working on any new block that may accept the new transaction) or continues (otherwise) solving the mathematical puzzle required to add a corresponding new block to the blockchain; particularly, the validation engine calculates the hash of the header of the new block corresponding to a possible value of the nonce. Meanwhile, the validation engine at block 457 may receive (via the VPN client) a new block from another validator. A test is then made at block 458, wherein the validation engine verifies whether a new block may be created (since the corresponding mathematical puzzle has been solved) or a new block has been received. If not, the process returns to the block 456 to try again solving the mathematical puzzle (by reiterating the calculation of the hash of the header with another value of the nonce). Conversely, as soon as the validation engine has solved the mathematical puzzle (by finding the nonce that makes the hash of the header lower than the target) or a new block has been received, the process descends into block 459 wherein the process branches accordingly. If the mathematical puzzle has been solved the validation engine at block 460 creates the corresponding new block (by adding as many new transactions that are pending as possible to its body and completing the header with the required information). Conversely, if the new block has been received the validation engine at block 461 verifies whether the new block is not comprised in its current version of the blockchain (in the corresponding repository). If so, the validation engine validates the new block (by verifying its previous hash, Merkle root, proof of work and transactions).

The flow of activity branches at block 462 according to a result of this operation. In case the new block is already comprised in the blockchain or in case of negative result of its validation, the process returns to the block 456 (thereby discarding it) to try again solving the mathematical puzzle (or to the block 450, not shown in the figure, when the new block has been received while the validation engine was idle). Conversely, in case of positive result of the validation of the new block (not already comprised in the blockchain) the process continues to block 463. The same point is also reached from the block 460 after the creation of the new block. At this point, the validation engine adds the new block (created/received) to the blockchain (into the corresponding repository), at the same time discarding any pending new transactions comprised therein. The validation engine at block 464 then distributes the new block into the VPN (via the VPN server). The flow of activity branches at block 465 according to a status of the validation engine. If the validation engine is still working on any new transactions that are pending, the process returns to the block 456; conversely, if no new transaction remains pending the process returns to the block 450.

The new blocks that are created and distributed into the VPN by the validators (as described above) are used by the other decoders (not operating as validators) and by the provider system simply to update their versions of the blockchain.

Particularly, in the swim-lane of each access device whose decoder is not operating as validator the access client is in a listening condition at block 466 (via the VPN client) for any new blocks. As soon as the access client receives a new block, the access client at block 467 verifies whether the new block is not comprised in its current version of the blockchain (in the corresponding repository); if so, the access client validates the new block (by verifying its previous hash, Merkle root and proof of work). The flow of activity then branches at block 468 according to a result of this operation. In case the new block is already comprised in the blockchain or in case of negative result of its validation, the process directly returns to the block 466 (thereby discarding it). Conversely, in case of positive result of the validation of the new block (not already comprised in the blockchain) the access client block 469 adds it to the blockchain (in the corresponding repository). The process then returns to the block 466.

With reference instead to the swim-lane of the provider system, likewise the access manager is in a listening condition at block 470 (via the VPN server) for any new blocks. As soon as the access manager receives a new block, the access manager at block 471 verifies whether the new block is not comprised in its current version of the blockchain (in the corresponding repository). If so, the access manager validates the new block (by verifying its previous hash, Merkle root and proof of work). The flow of activity then branches at block 472 according to a result of this operation. In case the new block is already comprised in the blockchain or in case of negative result of its validation, the process directly returns to the block 470 (thereby discarding it). Conversely, in case of positive result of the validation of the new block (not already comprised in the blockchain) the access manager block 473 adds it to the blockchain (in the corresponding repository). For each transaction of the new block relating to an access request (if any), the access manager at block 474 retrieves the remote key associated with the identifier of the set of TV transmissions indicated in the transaction (via the cryptographic engine) and transmits it to the network address of the identifier of the decoder indicated in the transaction over the VPN (via the VPN server). The process then returns to the block 470. Moving to the swim-lane of each of these access devices, the access client at block 475 receives the new version of the remote key over the VPN (via the VPN client). The access client at block 476 retrieves the local key from the smartcard (via the smartcard drive that requests it to the I/O interface, which in turn retrieves it from the key repository). At this point, the access client passes the new version of the remote key and the local key to the cryptographic engine, which combines them into a corresponding new version of the transmission key (without using it at the moment).

With reference again to the swim-lane of the provider system, the process passes from block 477 to block 478 whenever any transmission key (for a corresponding set of TV transmissions) is to be changed. For example, this happens when the transmission key is required for the first time by a new decoder after its turn-on and in any case periodically (for example, every 1-2 hours). In response thereto, the cryptographic engine generates a new version of the corresponding remote key (for example, in a pseudo-random way). The cryptographic engine at block 479 combines the new version of the remote key and the (fixed) local key into a corresponding new version of the transmission key (without using it at the moment). The access manager at block 480 broadcasts a change notification together with the corresponding TV transmissions to all the decoders, in order to inform them that the transmission key will be changed in the future. This will happen with a delay (for example, 10-20 minutes) sufficient to allow the decoders to receive the new version of the remote key using the blockchain (as described above). The change notification indicates the identifier of the corresponding set of TV transmissions and a change time at which the transmission key will be changed. The access manager enters an idle loop at block 481 waiting for the change time. As soon as the change time is reached, the encryption engine at block 482 saves the new version of the transmission key with the corresponding remote key into the corresponding list (by replacing their previous versions) so as to start encrypting the corresponding set of TV transmissions with this transmission key.

At the same time, in the swim-lane of each access device the access client at block 483 receives the change notification (via the TV tuner drive); in response thereto, the access client creates a corresponding new transaction and distributes it into the VPN (at the block 448) in order to receive the new version of the remote key (as described above). Meanwhile, the access client enters an idle loop at block 484 waiting for the change time (indicated in the change notification). As soon as the change time is reached, the encryption engine at block 485 saves the new version of the transmission key (which should have been generated meanwhile as described above) by replacing its previous version, so as to start decrypting the corresponding set of TV transmissions with this transmission key.

In this way, the transmission keys may be changed without any interruption of the TV transmissions (despite the relatively long time that is required by the decoders to obtain the new version of the corresponding remote keys using the blockchain).

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof. Conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. Moreover, items presented in a same group and different embodiments, examples or alternatives are not to be construed as de facto equivalent to each other (but they are separate and autonomous entities). In any case, each numerical value should be read as modified by the term about (unless already done) and each range of numerical values should be intended as expressly specifying any possible number along the continuum within the range (comprising its end points). Moreover, ordinal or other qualifiers are merely used as labels to distinguish elements with the same name but do not by themselves connote any priority, precedence or order. The terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for controlling access to data being broadcast over a telecommunication medium. However, the data may be of any type (for example, any data stream such as television, radio, music or any other data such as documents, databases). Moreover, the data may be broadcast in any way (for example, from any number and type of stations with any broadcasting range) over any telecommunication medium (for example, waves, cables, satellites, Internet) for any purposes (for example, displaying, playing, reading, processing).

In an embodiment, the method comprises submitting (by an access device) an access request for accessing the data by the access device to a plurality of validator devices. However, the access device may be of any type (see below) and the validator devices may be in any number and of any type (for example, selected access devices, dedicated computing machines or any combination thereof); moreover, the access request may be of any type (for example, simply indicating the access device with or without additional information such as its fingerprint, the data to be accessed) and it may be submitted in any way (for example, over a secure network, encrypted over a public network).

In an embodiment, the method comprises validating (by each of the validator devices) the access request according to corresponding entitlements to access the data being granted by a provider system to a plurality of access devices. However, the validator devices may validate the access request in any way (for example, by verifying the entitlements with or without authenticating the access devices) according to any entitlements (for example, subscriptions to one or more transmissions, authorizations for single events or data on demand) granted in any way (for example, following payments, in trial mode, according to roles); moreover, the entitlements may be provided in any way (for example, comprised in the blockchain or in a dedicated memory structure) by any provider system (see below).

In an embodiment, the method comprises updating (by the validator devices) a blockchain comprising a sequence of blocks linked to each other according to corresponding hashes. However, the blockchain may be of any type (for example, permissioned, permissionless); moreover, the blocks may be of any type (for example, with body and/or header comprising partial, different and additional pieces of information with respect to the ones mentioned above) linked to each other in any way (for example, the previous hashes with or without global hashes thereof).

In an embodiment, the method comprises updating (by the validator devices) the blockchain by adding a new one of the blocks comprising an indication of the access request in response to a consensus at least partial of the validator devices to a positive result of said validating the access request. However, the blockchain may be updated in any way (for example, according to a proof of work schema based on any mathematical puzzle or to a proof of stake schema) in response to any type of consensus (for example, by actually controlling that the access request has been validated by at least any percentage of the validator devices, up to all of them, or without any control by simply waiting a pre-defined time after the addition of any new block). Moreover, the new block may be of any type (for example, a new block comprising any number of transactions, from a single one to as many as possible) and it may be added to the blockchain in any way (for example, only in case of positive result of the validation of the corresponding access requests or always together with the indication of the results of the validation).

In an embodiment, the method comprises transmitting (by the provider system) cryptographic information to the access device in response to the new block. However, the cryptographic information may be of any type (for example, a cryptographic key or a part thereof) and it may be transmitted to the access device in any way (for example, directly, in the blockchain or broadcast together with the data in a protected way such as encrypted with a public key of the access device).

In an embodiment, the method comprises encrypting (by the provider system) the data into encrypted data according to the cryptographic information. However, the data may be encrypted in any way (for example, by applying an encryption function, a scrambling method).

In an embodiment, the method comprises broadcasting (by the provider system) the encrypted data. However, the encrypted data may be broadcast in any way (for example, in a channel, a web site).

In an embodiment, the method comprises receiving (by the access device) the encrypted data being broadcast by the provider system. However, the encrypted data may be received in any way (for example, by tuning to the corresponding channel, accessing the corresponding web site).

In an embodiment, the method comprises decrypting (by the access device) the encrypted data into the data according to the cryptographic information. However, the encrypted data may be decrypted in any way (for example, by applying a decryption function, a descrambling method) according to the cryptographic information (for example, alone or in combination with any other piece of information provided in any way).

In an embodiment, the method comprises determining (by the access device) an actual fingerprint thereof based on one or more physical features characterizing the access device. However, the physical features may be in any number and of any type (for example, hardware features, software features or any combination thereof) and they may be collected in any way (for example, measured whenever necessary or when the access device turns-on); moreover, the actual fingerprint may be determined in any way (for example, according to any combination of the physical features such as their product, sum, concatenation).

In an embodiment, the method comprises authenticating (by the provider system) the access device according to corresponding known fingerprints of the access devices, with the access device that is authenticated according to a match of the actual fingerprint of the access device with the corresponding known fingerprint. However, the access request may be authenticated according to any match of the fingerprints (for example, only when they are equal or even tolerating a difference below a threshold to take into account measuring errors) and for any purpose (for example, for connecting the access device to the network, validating the access requests).

In an embodiment, the blockchain is permissioned. However, the blockchain may be of any permissioned type (for example, private or consortium).

In an embodiment, the validator devices are vetted by the provider system. However, the validator devices may be vetted in any way (for example, statically, dynamically, either in a fixed or variable way such as periodically).

In an embodiment, the validator devices are selected ones of the access devices. However, the validator devices may be selected in any way among the access devices (for example, random or according to their locations).

In an embodiment, the provider system, the access devices and the validator devices communicate to each other over a virtual private network implemented by the provider system over a public network. However, the virtual private network may be implemented in any way (for example, by the provider system or a dedicated computing machine) over any public network (for example, the Internet, a WAN). In any case, the possibility is not excluded of using any other secure network (for example, a private network such as a LAN) or more generally any other network.

In an embodiment, the method comprises submitting (by the access device) a start request for starting operation of the access device to the provider system. However, the start request may be submitted in any way (either the same or different with respect to the other requests).

In an embodiment, the method comprises returning (by the provider system) an indication of a plurality of verificator devices to the access device in response to the start request. However, the verificator devices may be in any number and of any type (for example, selected access devices, selected validator devices, dedicated computing machines or any combination thereof) and their indication may be returned in any way (for example, transmitted directly, distributed into the network or broadcast together with the data).

In an embodiment, the method comprises submitting (by the access device) a verification request for verifying the access device to the verificator devices. However, the verification request may be of any type (for example, based on the fingerprint of the access device, a signature with its private key or simply its identifier) and it may be submitted in any way (either the same or different with respect to the other requests).

In an embodiment, the method comprises verifying (by each of the verificator devices) the access device in response to the verification request. However, the access device may be verified in any way (for example, requesting the intervention of the provider system, directly by each verificator device, alternatively or in combination).

In an embodiment, the method comprises transmitting (by the provider system) the cryptographic information to the access device in response to a consensus at least partial of the verificator devices to a positive result of said verifying the access device. However, the cryptographic information may be transmitted to the access device in any way (either the same or different with respect to above); moreover, the consensus to the verification of the access device may be defined and determined in any way (either the same or difference with respect to above).

In an embodiment, the method comprises submitting (by the access device) a further start request for starting operation of the access device to the provider system. However, the further start request may be submitted in any way (see above).

In an embodiment, the method comprises refusing (by the provider system) the further start request in response to a lack of the new block in the blockchain that is more recent than the start request. However, the relevant times may be of any type (for example, relating to its last transaction, creation or addition to the blockchain for the new block and relating to its creation, submission, reception for the access request). Moreover, the further start request may be refused in any way (for example, only when the time elapsed from the start request is lower than any threshold or even always, with or without the possibility of logging it for auditing).

In an embodiment, the method comprises submitting (by the access device) the verification request comprising the actual fingerprint of the access device to the verificator devices. However, the actual fingerprint may be provided to the verificator devices in any way (for example, in the same or in a separate message).

In an embodiment, the method comprises verifying (by each of the verificator devices) the access device according to a match of the actual fingerprint of the access device with the corresponding known fingerprint in response to the verification request. However, the access device may be verified according to any match of the fingerprints (either the same or different with respect to above).

In an embodiment, the method comprises selecting (by the provider system) the verificator devices among the access devices. However, the verificator devices may be selected in any way among the access devices (for example, in a fixed way such as according to their locations or even in a variable way).

In an embodiment, the method comprises determining (by each of the verificator devices) the actual fingerprint thereof. However, the actual fingerprint may be determined in any way (see above).

In an embodiment, the method comprises submitting (by each of the verificator devices) a further verification request for verifying the actual fingerprint of the access device and the actual fingerprint of the verificator device to the provider system. However, the further verification request may be submitted in any way (either the same or different with respect to the other requests); in any case, the possibility of using the fingerprint of the access device only is not excluded.

In an embodiment, the method comprises determining (by the provider system) a result of said verifying the access device for each of the verificator devices according to a match of the actual fingerprint of the access device and the actual fingerprint of the authentication device with the corresponding known fingerprints in response to the further verification request. However, the result of the verification may be determined according to any match of the fingerprints (for example, positive when both actual fingerprints match their known fingerprints and negative otherwise; or using the actual fingerprint of the verificator device to accept/refuse the verification request and determining its result only according to the actual fingerprint of the access device).

In an embodiment, the method comprises returning (by the provider system) the result of said verifying the access device for each of the verificator devices to the verificator device. However, the result may be returned in any way (either the same or different with respect to the submission of the further verification request).

In an embodiment, for each of the verificator devices the method comprises saving (by the verificator device) the result of said verifying the access device. However, the result of the verification may be saved in any way (for example, into a dedicated cache memory or any structure of the working memory such as a table or a list).

In an embodiment, for each of the verificator devices the method comprises receiving (by the verificator device) a next verification request for verifying the access device from the access device. However, the next verification request may be received in any way (see above).

In an embodiment, for each of the verificator devices the method comprises retrieving (by the verificator device) the result of said verifying the access device being saved therein in response to the next verification request. However, the saved result may be used in any way (for example, always or only when its age is lower than a threshold); in any case, the possibility is not excluded of determining the result of the verification always through the provider system.

In an embodiment, the method comprises generating (by the provider system) a new version of the cryptographic information. However, the new version of the cryptographic information may be generated in response to any event (for example, for each new access device, periodically with any frequency or both of them).

In an embodiment, the method comprises notifying (by the provider system) a future use at a change time of the new version of the cryptographic information to the access devices. However, the future use may be notified in any way (for example, broadcast together with the data, distributed into the network, transmitted to each access device individually); moreover, the change time may be defined in any way (for example, an actual time or a delay).

In an embodiment, the method comprises submitting (by the access devices) corresponding further access requests for accessing the data by the access devices to the validator devices in response to said notifying the future use. However, the further access requests may be of any type and they may be submitted in any way (see above).

In an embodiment, the method comprises validating (by each of the validator devices) the further access requests according to the corresponding entitlements. However, the further access requests may be validated in any way (see above).

In an embodiment, the method comprises updating (by each of the validator devices) the blockchain by adding further new one or more of the blocks each comprising an indication of one or more of the further access requests in response to a consensus at least partial of the validator devices to a positive result of said validating the corresponding further access requests. However, the blockchain may be updated in any way (see above).

In an embodiment, the method comprises transmitting (by the provider system) the new version of the cryptographic information to each of the access devices in response to the corresponding further new block. However, the new version of the cryptographic information may be transmitted to each of the access devices in any way (see above).

In an embodiment, the method comprises encrypting (by the provider system) the data into a new version of the encrypted data according to the new version of the cryptographic information after the change time. However, the data may be encrypted in any way (see above); in any case, the possibility is not excluded of managing the change of the cryptographic information in any other way (for example, by applying the new version of the cryptographic information in response its reception by all the access devices or a predetermined percentage thereof or even without any delay such as when the data are not a stream that needs to be received continuously).

In an embodiment, the method comprises decrypting (by each of the access devices) the encrypted data into the data according to the new version of the cryptographic information after the change time. However, the encrypted data may be decrypted in any way (see above). In any case, the possibility is not excluded of managing the new version of the cryptographic information in any other way (for example, by using it in response to a notification of its application from the provider system or even automatically as soon as the data may not be decrypted any longer with the current version of the cryptographic information).

In an embodiment, the method comprises submitting (by the provider system) corresponding entitlement requests for setting the entitlements to the validator devices. However, the entitlement requests may be of any type (for example, adding/removing access devices, updating their authorizations for accessing the data) and they may be submitted in any way (either the same or different with respect to the other requests).

In an embodiment, the method comprises validating (by each of the validator devices) each of the entitlement requests. However, the entitlement requests may be validated in any way (for example, by authenticating the provider system with or without verifying the entitlement in external information sources).

In an embodiment, the method comprises updating (by the validator devices) the blockchain by adding still further new one or more of the blocks each comprising an indication of one or more of the entitlements in response to a positive result of said validating the corresponding entitlement requests. However, the blockchain may be updated in any way (either the same or different with respect to above).

In an embodiment, the method comprises validating (by each of the validator devices) the access request according to the entitlement of the access device contained in the blockchain. However, the possibility is not excluded of validating the access request according to the entitlements that are stored elsewhere, and then without the need of adding corresponding blocks to the blockchain (for example, by accessing external information sources).

In an embodiment, the method comprises constructing (by the access device) the access request according to the entitlement of the access device contained in the blockchain. However, the possibility is not excluded of constructing the access request in any other way (for example, according to the corresponding entitlement that is stored elsewhere such as in the smartcard or even independently thereof when the data to be accessed are not indicated in the access request).

In an embodiment, the data comprise a television transmission. However, the television transmission may be of any type (for example, pay TV, pay-per-view TV, TV on demand).

In an embodiment, the method comprises providing (by the access device) the television transmission that has been decrypted to a TV set for displaying thereon. However, the decrypted television transmission may be provided to the TV set in any way (for example, with a wired or wireless connection); in any case, the possibility is not excluded of having an integrated device with both the functions of TV set and access device.

In an embodiment, the access devices comprise corresponding decoder devices and corresponding portable devices removably coupled therewith. However, the decoder devices may be of any type (for example, set-top-boxes, integrated decoders); moreover, the portable devices may be of any type (for example, smartcards, memory keys) and they may be coupled removably with the decoders devices in any way (for example, with a contact or contactless connection). In any case, the possibility is not excluded of using a stand-alone access device without any removable part.

In an embodiment, the portable devices store further cryptographic information. However, the further cryptographic information may be of any type (for example, the same for all the data or different for corresponding groups thereof) or it may be missing at all.

In an embodiment, the method comprises generating (by the provider system) a cryptographic key according to the cryptographic information and the further cryptographic information. However, the cryptographic key may be generated in any way (for example, by concatenating two parts or by combining them in any way such as adding, multiplying, dividing) or it may be simply equal to the cryptographic information (when the further cryptographic information is missing).

In an embodiment, the method comprises encrypting (by the provider system) the data with the cryptographic key. However, the possibility is not excluded of using the cryptographic information and the further cryptographic information in any other way (for example, by encrypting the data with the first one and then the obtained result with the second one).

In an embodiment, the method comprises generating (by the access device) the cryptographic key according to the cryptographic information being transmitted thereto by the provider system and to the further cryptographic information being retrieved from the corresponding portable device. However, the cryptographic key may be generated by the access device in any way (as it is generated by the provider system).

In an embodiment, the method comprises decrypting (by the access device) the encrypted data with the cryptographic key. However, the encrypted data may be decrypted in any way (according to how it has been encrypted).

An embodiment provides a method for broadcasting data over a telecommunication medium. In an embodiment, the method comprises transmitting (by a provider system) cryptographic information to each of a plurality of access devices in response to a consensus at least partial of a plurality of validator devices to a new block of a blockchain comprising an indication of a positive result of a validation of an access request for accessing the data by the access device. In an embodiment, the method comprises encrypting (by the provider system) the data into encrypted data according to the cryptographic information. In an embodiment, the method comprises broadcasting (by the provider system) the encrypted data.

An embodiment provides a method for accessing data that are broadcast over a telecommunication medium. In an embodiment, the method comprises receiving (by an access device) an access request for accessing the data from a further access device. In an embodiment, the method comprises validating (by the access device) the access request according to corresponding entitlements to access the data being granted by a provider system to a plurality of access devices. In an embodiment, the method comprises updating (by the access device) a blockchain, comprising a sequence of blocks linked to each other according to corresponding hashes, by adding a new one of the blocks comprising an indication of the access request in response to a consensus at least partial of a plurality of validator devices comprising the access device to a positive result of said validating the access request. In an embodiment, the method comprises submitting (by the access device) a further access request for accessing the data by the access device to the validator devices. In an embodiment, the method comprises receiving (by the access device) cryptographic information from the provider system in response to a further new one of the blocks comprising an indication of the further access request. In an embodiment, the method comprises receiving (by the access device) the data encrypted according to the cryptographic information being broadcast by the provider system. In an embodiment, the method comprises decrypting (by the access device) the encrypted data into the data according to the cryptographic information.

The same considerations pointed out above with reference to the method for controlling access to data (comprising each of its additional features) apply mutatis mutandis to the method for broadcasting data and to the method for accessing data.

Generally, similar considerations apply if the same solution is implemented with equivalent methods (by using similar steps with the same functions of more steps or portions thereof, removing some non-essential steps or adding further optional steps). Moreover, the steps may be performed in a different order, concurrently or in an interleaved way (at least in part).

An embodiment provides a computer program configured for causing a computing structure to perform the above-described methods when the computer program is executed on the computing structure. An embodiment provides a computer program product that comprises a computer readable storage medium having program instructions embodied therewith; the program instructions are executable by a computing structure to cause the computing structure to perform the same methods. However, the computer program may be implemented as a stand-alone module, as a plug-in for a pre-existing software program (for example, any access manager or access client), or even directly in the latter. Moreover, the computer program may be executed on any computing structure; particularly, the computer program may be executed on a computing structure comprising the provider system, the access devices and the validator devices when implementing the method for controlling access to data, on the provider system when implementing the method for broadcasting data and on each access device when implementing the method for accessing data. In any case, the solution according to an embodiment of the present disclosure lends itself to be implemented even with a hardware structure (for example, by electronic circuits integrated in one or more chips of semiconductor material), or with a combination of software and hardware suitably programmed or otherwise configured.

An embodiment provides a structure comprising means that are configured for performing each of the steps of the above-described methods. An embodiment provides a structure comprising a circuit (i.e., any hardware suitably configured, for example, by software) for performing each of the steps of the same methods. However, the structure may be of any type (for example, formed by the provider system, the access devices and the validator devices, by the provider system alone or by each access device alone). Moreover, the structure may be implemented by any number and type of physical machines, virtual machines or any static/dynamic combination thereof (for example, with the provider system implemented by a server, a cluster of one or more servers or a cloud service, and with each access device implemented by a decoder and a smartcard, a decoder alone or any other receiver).

Generally, similar considerations apply if the provider system and the access devices each has a different structure or comprises equivalent components or it has other operative characteristics. In any case, every component thereof may be separated into more elements, or two or more components may be combined together into a single element. Moreover, each component may be replicated to support the execution of the corresponding operations in parallel. Moreover, unless specified otherwise, any interaction between different components generally does not need to be continuous, and it may be either direct or indirect through one or more intermediaries.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention.

In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The above-described features may be combined in any way.

What is claimed is:

1. A method for controlling access to data being broadcast over a telecommunication medium, wherein the method comprises:
   transmitting, by the provider system, cryptographic information in response to a blockchain being updated by a plurality of validator devices, the blockchain comprising a sequence of blocks linked to each other according to corresponding hashes, by adding a new one of the blocks comprising an indication of the first access request in response to a first consensus of at least some of the validator devices to a positive result of said validating the first access request,
   encrypting, by the provider system, the data into encrypted data according to the cryptographic information, wherein the encrypted data can be decrypted by a first access device using the cryptographic information and a local key from a drive of the first access device, and
   broadcasting, by the provider system, the encrypted data.

2. The method according to claim 1, wherein the method further comprises:
   determining, by the first access device that submitted the first access request, a first device fingerprint thereof based on one or more physical features characterizing the first access device, and
   authenticating the first access device according to corresponding known fingerprints of the plurality of access devices, the first access device being authenticated according to a match of the first device fingerprint of the first access device with the corresponding known device fingerprint.

3. The method according to claim 1, wherein the blockchain is permissioned with the validator devices being vetted by the provider system.

4. The method according to claim 3, wherein the validator devices are selected from a plurality of access devices.

5. The method according to claim 4, wherein the provider system, the plurality of access devices, and the validator devices communicate to each other over a virtual private network implemented by the provider system over a public network.

6. The method according to claim 1, wherein the method further comprises:
   submitting a first start request to the provider system for starting operation of the first access device,
   returning an indication of a plurality of verificator devices to the first access device in response to the first start request, submitting a first verification request for verifying the first access device to the verificator devices, verifying the first access device in response to the first verification request, and transmitting the cryptographic information to the first access device in response to a second consensus of at least some of the verificator devices to a positive result of said verifying the first access device.

7. The method according to claim 6, wherein the method further comprises:

submitting a second start request for starting operation of the first access device to the provider system, and refusing the second start request in response to a lack of the new block in the blockchain being more recent than the second start request.

8. The method according to claim 6, wherein the method further comprises:

determining a first device fingerprint thereof based on one or more physical features characterizing the first access device, submitting the first verification request comprising the first device fingerprint to the verificator devices, and verifying by each of the verificator devices the first access device according to corresponding known fingerprints of the first access devices in response to the first verification request, the first access device being verified according to a match of the first device fingerprint of the first access device with the corresponding known device fingerprint.

9. The method according to claim 8, wherein the method further comprises:

selecting the verificator devices among a plurality of access devices, determining a second device fingerprint thereof, submitting a second verification request for verifying the first device fingerprint of the first access device and the second device fingerprint of the verificator device to the provider system, determining a result of said verifying the first access device for each of the verificator devices according to a match of the first device fingerprint of the first access device and the second device fingerprint of the verificator device with the corresponding known device fingerprints in response to the second verification request, and returning the result of said verifying the first access device for each of the verificator devices to the verificator device.

10. The method according to claim 9, wherein for each of the verificator devices the method further comprises:

saving the result of said verifying the first access device, receiving a third verification request for verifying the first access device from the first access device, and retrieving the result of said verifying the first access device being saved therein in response to the third verification request.

11. The method according to claim 1, wherein the method further comprises:

generating a new version of the cryptographic information, notifying a future use at a change time of the new version of the cryptographic information to the first access devices, submitting corresponding further access requests for accessing the data by the plurality of access devices to the validator devices in response to said notifying the future use, validating the further access requests according to the corresponding entitlements, updating the blockchain by adding further new one or more of the blocks each comprising an indication of one or more of the further access requests in response to a consensus of at least some of the validator devices to a positive result of said validating the corresponding further access requests, transmitting the new version of the cryptographic information to each of the plurality of access devices in response to the corresponding further new block, encrypting the data into a new version of the encrypted data according to the new version of the cryptographic information after the change time, and decrypting the encrypted data into the data according to the new version of the cryptographic information after the change time.

12. The method according to claim 1, wherein the method further comprises:

submitting corresponding entitlement requests for setting the entitlements to the validator devices, validating each of the entitlement requests, updating the blockchain by adding still further new one or more of the blocks each comprising an indication of one or more of the entitlements in response to a positive result of said validating the corresponding entitlement requests, and validating the first access request according to the entitlement of the first access device contained in the blockchain.

13. The method according to claim 12, wherein the method further comprises:

constructing the first access request according to the entitlement of the first access device contained in the blockchain.

14. The method according to claim 1, wherein the data comprise a television transmission, the method further comprising:

providing the television transmission being decrypted to a TV set for displaying thereon.

15. The method according to claim 1, wherein the first access devices that submitted the first access request is one of a plurality of first access devices that comprise corresponding decoder devices and corresponding portable devices removably coupled therewith, the portable devices storing further cryptographic information, wherein the method further comprises:

generating a cryptographic key according to the cryptographic information and the further cryptographic information, encrypting the data with the cryptographic key, generating the cryptographic key according to the cryptographic information being transmitted thereto by the provider system and to the further cryptographic information being retrieved from the corresponding portable device, and decrypting the encrypted data with the cryptographic key.

16. The method of claim 1, wherein the method further comprises:

transmitting cryptographic information to each of a plurality of access devices in response to the consensus of at least some of a plurality of validator devices to a new block of the blockchain comprising an indication of the positive result of a validation of the first access request for accessing the data by the first access device.

17. The method of claim 1, the method further comprises:

receiving a first access request for accessing the data from a second access device, validating the first access request according to corresponding entitlements to access the data being granted by a provider system to a plurality of access devices, updating a blockchain comprising a sequence of blocks linked to each other according to corresponding hashes, by adding a new one of the blocks comprising an indication of the first access request in response to a consensus at least partial of a plurality of validator devices comprising the first access device to a positive result of said validating the first access request, submitting a second access request for accessing the data by the first access device to the validator devices, receiving cryptographic information from the provider system in response to a further new one of the blocks comprising an indication of the second access request, receiving the data encrypted according to the updated cryptographic information being broadcast by the provider system, and decrypting the encrypted data into the data according to the updated cryptographic information.

18. A computer program product for controlling access to data being broadcast over a telecommunication medium, the computer program product comprising a computer readable storage medium having program instructions embodied therewith, the program instructions executable by a computing structure to cause the computing structure to perform a method comprising:

transmitting, by the provider system, cryptographic information in response to a blockchain being updated by a plurality of validator devices, the blockchain comprising a sequence of blocks linked to each other according to corresponding hashes, by adding a new one of the blocks comprising an indication of the first access request in response to a first consensus of at least some of the validator devices to a positive result of said validating the first access request, encrypting, by the provider system, the data into encrypted data according to the cryptographic information, wherein the encrypted data can be decrypted by a first access device using the cryptographic information and a local key from a drive of the first access device, and broadcasting, by the provider system, the encrypted data.

19. The computer program product according to claim 18, wherein the method further comprises:

determining, by the first access device that submitted the first access request, a first device fingerprint thereof based on one or more physical features characterizing the first access device, and authenticating the first access device according to corresponding known fingerprints of the plurality of access devices, the first access device being authenticated according to a match of the first device fingerprint of the first access device with the corresponding known device fingerprint.

20. A structure for controlling access to data being broadcast over a telecommunication medium, the structure comprising a provider system, a plurality of access devices, and a plurality of validator devices, wherein:

the provider system has a circuitry for transmitting cryptographic information in response to a blockchain being updated by a plurality of validator devices, the blockchain comprising a sequence of blocks linked to each other according to corresponding hashes, by adding a new one of the blocks comprising an indication of the first access request in response to a first consensus of at least some of the validator devices to a positive result of said validating the first access request, the provider system has a circuitry for encrypting the data into encrypted data according to the cryptographic information, wherein the encrypted data can be decrypted by a first access device using the cryptographic information and a local key from a drive of the first access device, the provider system has a circuitry for broadcasting the encrypted data.

21. The structure of claim 20, wherein:

the first access device has a circuitry for submitting a first start request to the provider system for starting operation of the first access device, the provider system has a circuitry for returning an indication of a plurality of verificator devices to the first access device in response to the first start request, the first access device has a circuitry for submitting a first verification request for verifying the first access device to the verificator devices, each of the verificator devices has a circuitry for verifying the first access device in response to the first verification request, and the provider system has a circuitry for transmitting the cryptographic information to the first access device in response to a second consensus of at least some of the verificator devices to a positive result of said verifying the first access device.

22. A method for controlling access to data being broadcast over a telecommunication medium, wherein the method comprises:

submitting, by a first access device of a plurality of access devices, a first access request for accessing the data by the first access device to a plurality of validator devices, receiving, by the first access device, cryptographic information sent by a provider system in response to a blockchain being updated by a plurality of validator devices, the blockchain comprising a sequence of blocks linked to each other according to corresponding hashes, by adding a new one of the blocks comprising an indication of the first access request in response to a first consensus of at least some of the validator devices to a positive result of said validating the first access request, receiving, by the first access device, the encrypted data being broadcast by the provider system, and decrypting, by the first access device, the encrypted data into the data according to the cryptographic information in combination with a local key from a drive of the first access device.

23. The method according to claim 22, wherein the method further comprises:

determining, by the first access device that submitted the first access request, a first device fingerprint thereof based on one or more physical features characterizing the first access device, and authenticating the first access device according to corresponding known fingerprints of the plurality of access devices, the first access device being authenticated according to a match of the first device fingerprint of the first access device with the corresponding known device fingerprint.

24. The method according to claim 22, wherein the method further comprises:

submitting a first start request to the provider system for starting operation of the first access device, returning an indication of a plurality of verificator devices to the first access device in response to the first start request, submitting a first verification request for verifying the first access device to the verificator devices, verifying the first access device in response to the first verification request, and transmitting the cryptographic information to the first access device in response to a second consensus of at least some of the verificator devices to a positive result of said verifying the first access device.

25. The method according to claim 22, wherein the method further comprises:

generating a new version of the cryptographic information, notifying a future use at a change time of the new version of the cryptographic information to the first access devices, submitting corresponding further access requests for accessing the data by the plurality of access devices to the validator devices in response to said notifying the future use, validating the further access requests according to the corresponding entitlements, updating the blockchain by adding further new one or more of the blocks each comprising an indication of one or more of the further access requests in response to a consensus of at least some of the validator devices to a positive result of said validating the corresponding further access requests, transmitting the new version of the cryptographic information to each of the plurality of access devices in response to the corresponding further new block, encrypting the data into a new version of the encrypted data according to the new version of the cryptographic information after the change time, and decrypting the encrypted data into the data according to the new version of the cryptographic information after the change time.

* * * * *